(12) United States Patent
Iyanagi et al.

(10) Patent No.: US 7,704,344 B2
(45) Date of Patent: Apr. 27, 2010

(54) TIRE BUILDING DRUM AND TIRE BUILDING METHOD

(75) Inventors: Satoshi Iyanagi, Kodaira (JP); Nobuyuki Hirai, Kodaira (JP); Yuichiro Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1079 days.

(21) Appl. No.: 10/523,686

(22) PCT Filed: Aug. 5, 2003

(86) PCT No.: PCT/JP03/09949

§ 371 (c)(1),
(2), (4) Date: Aug. 11, 2005

(87) PCT Pub. No.: WO2004/012928

PCT Pub. Date: Feb. 12, 2004

(65) Prior Publication Data

US 2006/0102272 A1    May 18, 2006

(30) Foreign Application Priority Data

Aug. 5, 2002 (JP) .............................. 2002-227096
Sep. 19, 2002 (JP) .............................. 2002-273135
Nov. 11, 2002 (JP) .............................. 2002-326777
Dec. 26, 2002 (JP) .............................. 2002-377249

(51) Int. Cl.
  *B29D 30/32* (2006.01)
  *B29D 30/26* (2006.01)
(52) U.S. Cl. ..................... 156/132; 156/402; 156/415; 156/417; 156/420

(58) Field of Classification Search ................. 156/123, 156/130.3, 131–133, 398–403, 414–417, 156/420
See application file for complete search history.

(56) References Cited

U.S. PATENT DOCUMENTS

| 2,605,197 | A | * | 7/1952 | Stevens | ...................... 156/402 |
| 3,616,059 | A |  | 10/1971 | Frazier | |
| 3,684,621 | A | * | 8/1972 | Frazier et al. | ............... 156/401 |
| 3,767,509 | A | * | 10/1973 | Gazuit | ......................... 156/415 |
| 3,795,564 | A | * | 3/1974 | Mallory | ...................... 156/417 |
| 3,833,444 | A | * | 9/1974 | Mallory | ...................... 156/400 |

(Continued)

FOREIGN PATENT DOCUMENTS

DE    2124978 A    * 12/1971

(Continued)

*Primary Examiner*—Geoffrey L Knable
(74) *Attorney, Agent, or Firm*—Oliff & Berridge, PLC

(57) ABSTRACT

Tire building drum and tire building method, capable of assembling tire component members with high accuracy. A tire building drum is used, which includes at least one core body, which is disposed at an axial inside of a pair of bead lock means, and which comprises a plurality of sheets of rigid support members disposed in a toroidal shape and adapted to be displaced and thereby expanded or contracted. Bead cores are locked by the bead lock means, respectively, and a center portion of a carcass band is bulged while displacing the bead lock means close to each other. Back side portions of the carcass band are folded to radial outsides around the bead cores, respectively. The core body is then radially expanded to the maximum diameter while locking the bead cores, and tire component members are assembled onto the radially expanded core body.

24 Claims, 20 Drawing Sheets

U.S. PATENT DOCUMENTS

| | | | |
|---|---|---|---|
| 3,833,445 A * | 9/1974 | Mallory et al. | 156/401 |
| 3,867,231 A * | 2/1975 | Casey | 156/415 |
| 3,887,423 A | 6/1975 | Gazuit | |
| 4,007,081 A | 2/1977 | Mallory | |
| 4,468,267 A * | 8/1984 | Irie | 156/132 |
| 5,181,982 A | 1/1993 | Kumagai et al. | |
| 6,318,434 B1 * | 11/2001 | Gutknecht et al. | 156/402 |
| 2001/0050148 A1 | 12/2001 | Terazono | |
| 2003/0047284 A1 | 3/2003 | Akiyama | |

FOREIGN PATENT DOCUMENTS

| | | |
|---|---|---|
| EP | 0 459 728 A2 | 12/1991 |
| EP | 1 145 834 A2 | 10/2001 |
| EP | 1 295 704 A2 | 3/2003 |
| GB | 1 524 369 | 9/1978 |
| JP | 47-000393 A | 1/1972 |
| JP | 49-087775 A | 8/1974 |
| JP | 06-55664 A | 3/1994 |

* cited by examiner

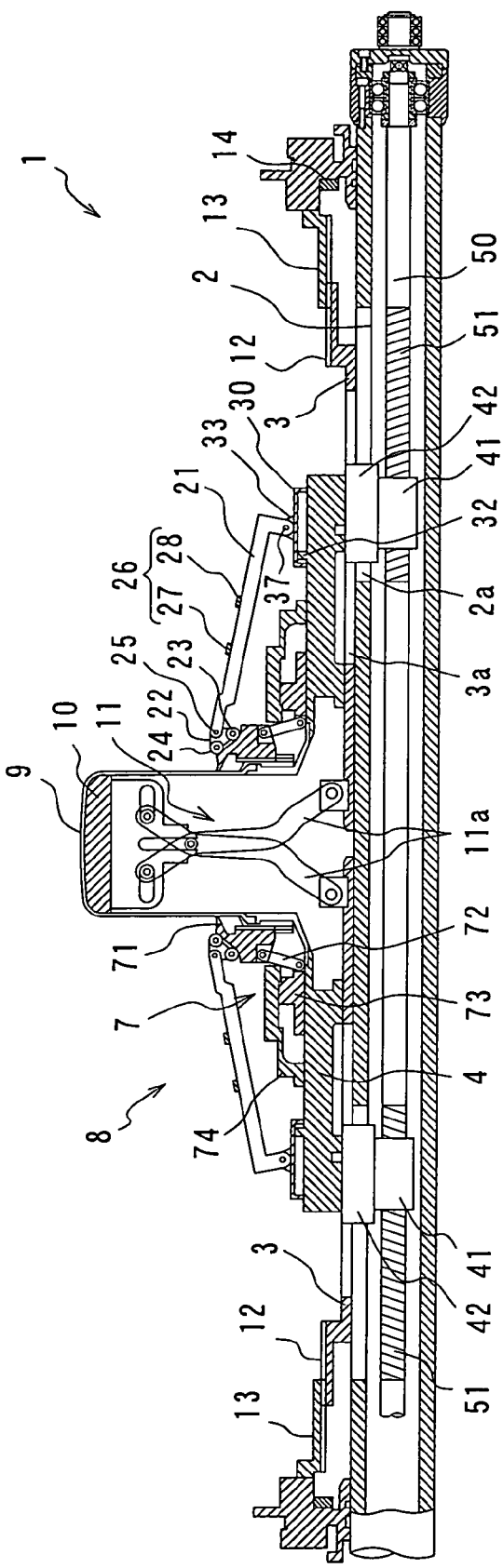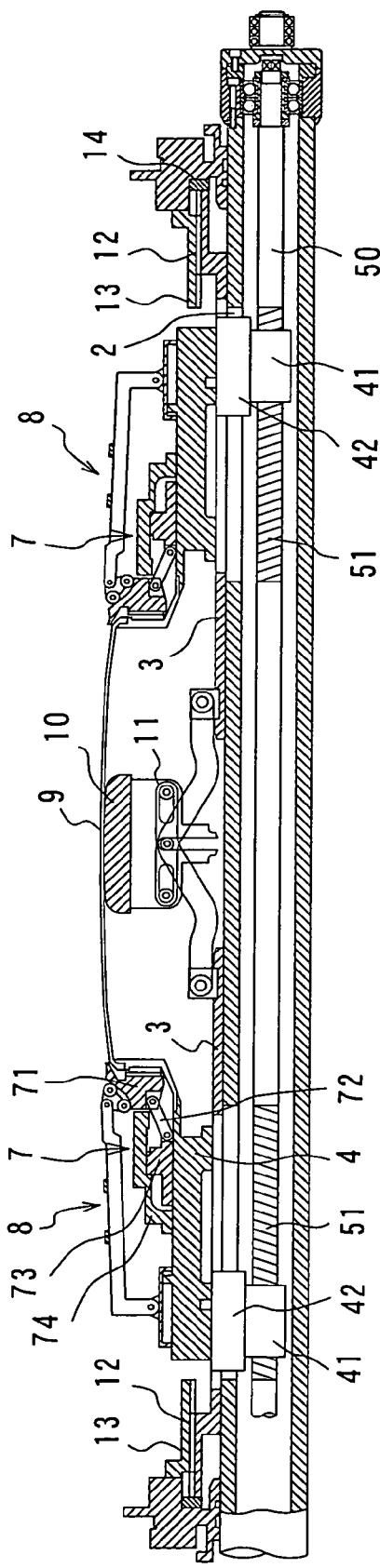

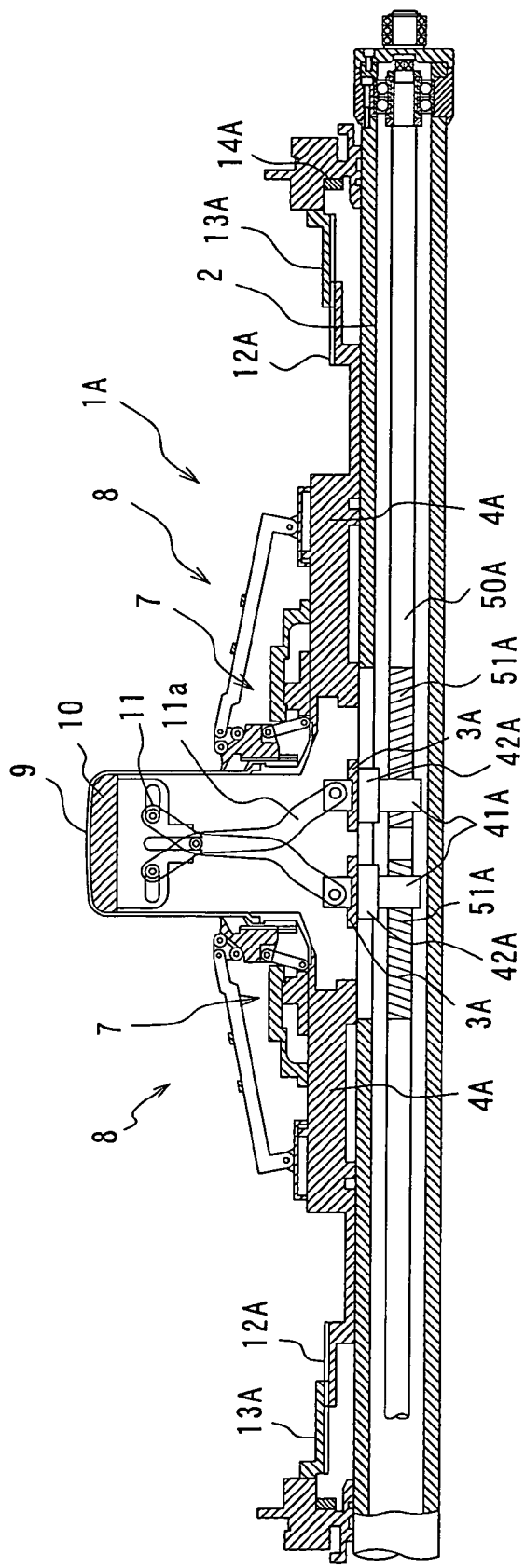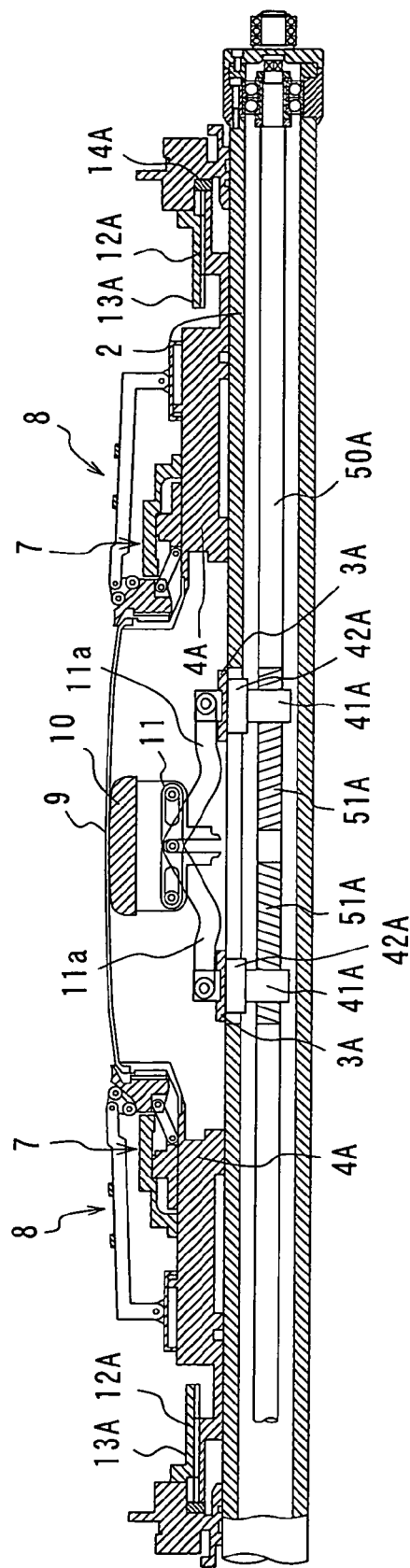

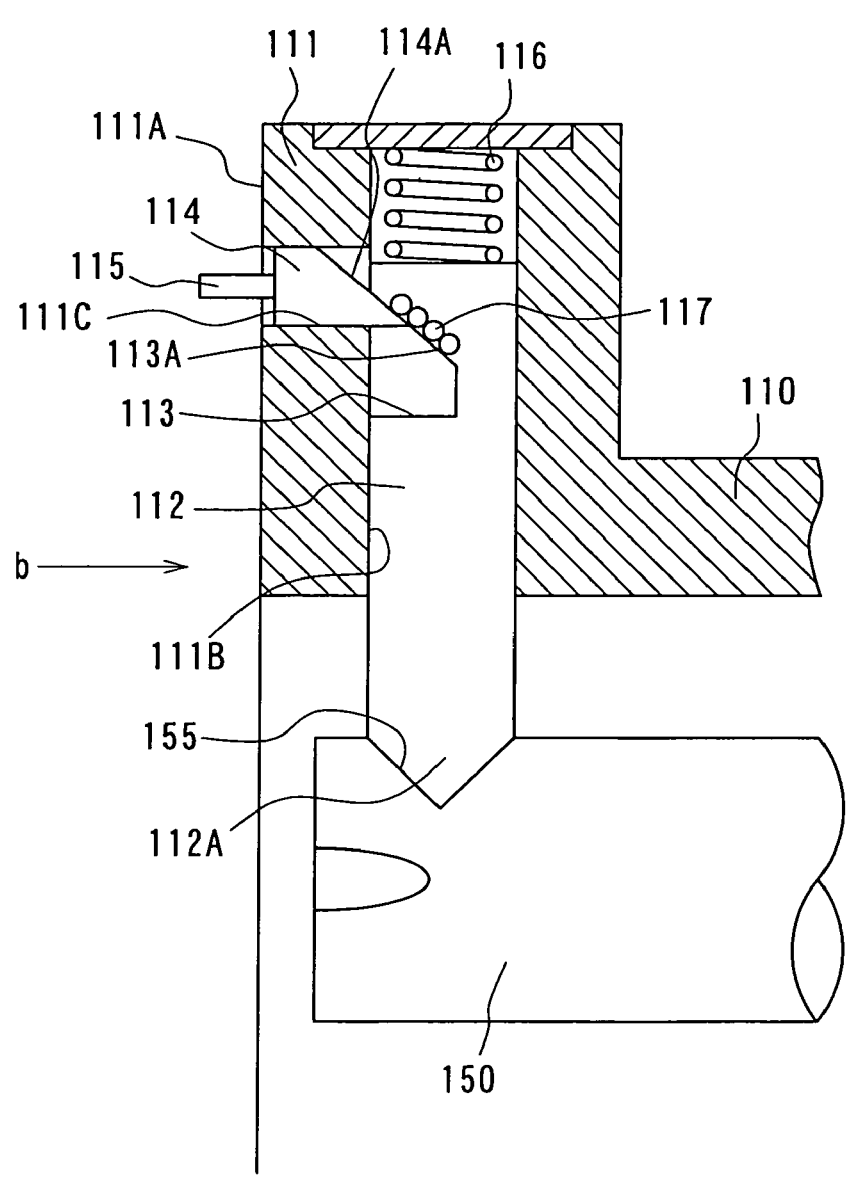
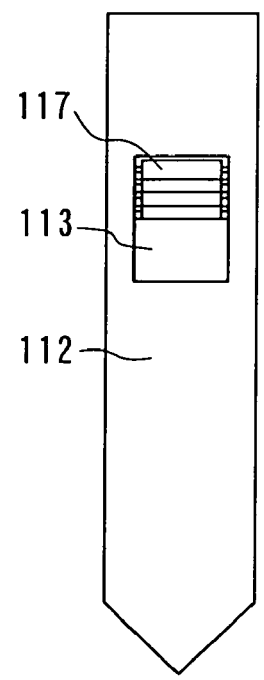
FIG. 22a
FIG. 22b

TIRE BUILDING DRUM AND TIRE BUILDING METHOD

TECHNICAL FIELD

The present invention relates to a tire building drum and a tire building method for conducting a tire building process from a carcass band up to formation of green tire on the same building drum, and particularly to those for molding a tire with high accuracy.

BACKGROUND ART

In molding a green tire, there has been conventionally conducted a method comprising the steps of: providing a cylindrical carcass band or green case on a shaping drum; bulging a center portion of the carcass band or green case into a toroidal shape; and uniting it to a belt/tread band established by bonding tire component members such as a belt member and a tread rubber separately on a belt/tread forming drum.

However, in such a conventional method, the belt/tread band is once detached from the belt/tread forming drum, gripped from radially outside, moved to the shaping drum, and this gripping is released there so as to move the belt/tread band onto the shaping drum, with the result that the steps are made complicated and the tread band is gripped and released many times, thereby causing a problem of a deteriorated accuracy of relative positions between the carcass band or green case and the belt/tread band. To deal with it, there has been proposed a method for directly assembling tire component members to a carcass band on a building drum, as disclosed in JP-2002-326288A.

The above proposal is capable of solving the complexity of steps. However, in assembling tire component members, side portions of a carcass band are once folded back to radial outsides around bead cores, respectively, a center portion of the toroidally bulged carcass band is then supported from a radial inside by a core device in a state where the bead cores are not locked to a building drum, and tire component members are assembled onto the core device. This fails to attain a relative positional relationship between the assembled tire component members and bead cores with high accuracy, thereby still failing to solve the above problem in this point.

The present invention has been conceived in view of such a problem, and it is therefore an object of the present invention to provide a tire building drum and a tire building method capable of assembling tire component members directly onto a building drum having a carcass band provided thereon and capable of assembling the tire component members with high precision, in molding a tire by folding back side portions of the carcass band to radial outsides around bead cores, respectively.

DISCLOSURE OF INVENTION

The present invention has been carried out to achieve the above object, and its basic configurations and functions will be described below.

(1) The present invention provides a tire building drum comprising: a pair of bead lock means which are axially displaceable toward and away from each other for radial expansion or contraction; carcass band folding-back means, positioned adjacent to the bead lock means, respectively; and a center shaft for supporting these means;

wherein the tire building drum further comprises at least one core body at an axial inside of the bead lock means, the core body comprising a plurality of sheets of rigid support members which are toroidally disposed and axially displaceable for radial expansion or contraction.

With such a tire building drum, the core body comprising the plurality of sheets of rigid support members is provided so that tire component members such as a belt member, tread rubber, sidewall rubbers and the like can be precisely assembled based on the core body upon assembling these component members onto an outside of the bulged carcass band center portion, and the core body is provided to be positioned on the center shaft of the same building drum relative to the pair of bead lock means so that bonding precision of the component members relative to the bead cores positioned by the bead lock means can be enhanced to thereby allow a tire to be built with high precision.

(2) The present invention further provides a tire building drum according to the item (1), further comprising: a center bladder adapted to be axially deformed for radial expansion or contraction, which extends at a radial outside of the core body, and which has both axial side portions adapted to be displaced toward and away from each other integrally with the bead lock means, respectively;

wherein the rigid support members are provided with comb tooth portions, respectively, for engagement of the rigid support members with each other.

With such a tire building drum, the center bladder is provided so that gaps between the rigid support members at an outer peripheral surface defined by these rigid support members upon radially expanding the rigid support members are covered by the center bladder deformable for radial expansion or contraction to thereby enable a carcass band center portion to be uniformly supported and to thereby enable a bonding surface to be smoothened and uniformalized upon bonding the belt member thereto, and the rigid support members are engaged with each other by the functions of the respective comb tooth portions thereby allowing formation of highly precise bonding surface.

(3) The present invention further provides a tire building drum according to the item (1) or (2), wherein the bead lock means each comprise: bead lock segments circumferentially arranged adjacent to each other so as to be expanded or contracted in an annular shape; associated links having one ends hinged to the bead lock segments, respectively; bead lock pistons coupled to other ends of the links, respectively, and provided in axially displaceable manner; and bead lock cylinders adapted to displace the associated bead lock pistons, respectively.

With such a tire building drum, the bead lock pistons are axially displaced to thereby allow all the bead lock segments in the annular shapes to be displaced for radial expansion or contraction to uniformly retain the bead cores over the entire circumferences thereof, respectively, and the bead lock pistons are driven by the internal bead lock cylinders so that the building drum can be constituted compactly.

(4) The present invention also provides a tire building drum according to the item (3), further comprising: means for varying an axial position of that bead lock means relative to an axial side portion of the center bladder, which is located at the same axial side as the axial side portion of the center bladder.

With such a tire building drum, the axial position of the bead lock means is brought outwardly, to thereby allow a clearance to be ensured at the axial outside of the center bladder for detaching an associated bladder ring for latching an associated edge portion of the center bladder, thereby resultingly facilitating an exchanging operation of the center bladder.

(5) The present invention further provides a tire building drum according to any one of the items (1) through (4), wherein the carcass band folding-back means are adapted to be displaced toward and away from each other, integrally with the bead lock means at the axially same sides as the carcass band folding-back means, respectively; and wherein each of the carcass band folding-back means includes: a plurality of folding-back arms arranged in a circumferential direction and having tip end portions at axial insides, respectively; neck-turning members hinged to the tip end portions of the folding-back arms, respectively, so as to be swung to radial inside and outside; folding-back rollers circumferentially extending and born by longitudinal opposite end portions of the associated neck-turning members, respectively; a slide ring hinged to proximal ends of the plurality of folding-back arms and adapted to be displaceable to axial inside and outside relative to the associated bead lock means; and urging means for exerting a swinging force directed toward a radial inside, onto the folding-back arms.

With such a tire building drum, the folding-back rollers born by the longitudinal opposite end portions of the neck-turning members swingably coupled to the tip end portions of the folding-back arms can be rolledly contacted with the carcass band side portions to thereby fold back them, respectively, so that the swinging forces by the urging means can be converted into uniform urging forces to the carcass band center portion to thereby allow the carcass band side portions to be uniformly pressure-jointed to the carcass band center portion.

(6) The present invention further provides a tire building drum according to the item (5), wherein each of a pair of the folding-back rollers born by the associated neck-turning member is divided into two portions at both sides of an associated portion of the neck-turning member for supporting the folding-back roller, and is circumferentially protruded from the associated neck-turning member, so that protruded directions of the pair of folding-back rollers are opposite to each other, and so that a roller rotational shaft supporting portion corresponding to one of the pair of folding-back rollers has a circumferentially extended area positioned within a circumferentially extended area of the other folding-back roller.

With such a tire building drum, the folding-back rollers mounted on opposite ends of the associated neck-turning members are circumferentially oppositely protruded from the associated neck-turning members, respectively, i.e., these rollers are mounted on the associated arm in an offset manner, so that the roller of one folding-back arm protruded between neighboring folding-back arms does not interfere with the roller of another arm even when tip end portions of the folding-back arms are radially contracted and thus the neighboring tip end portions are narrowed in spacing, thereby allowing spacings between neighboring arms to be minimized, and in this way, the folding-back arms can be densely arranged in the circumferential direction while eliminating such a region of the carcass band side portion which is not pressure-jointed by any of the paired folding-back rollers in a state where the tip end portions of the folding-back arms are radially expanded, thereby enabling strong adhesion between the carcass band center portion and the carcass band side portion and enabling prevention of a relative displacement therebetween.

Further, the folding-back rollers at opposite ends of each neck-turning member are each divided into two portions at both sides of those portions of the neck-turning member which support the roller shafts for the rollers, respectively, thereby enabling prevention of a fact that: that portion of the carcass band side portion which is stretched toward a radial outside between neighboring rollers during folding back, is abutted on the non-rotating supporting portion and thus the carcass band side portion is damaged.

(7) The present invention further provides a tire building drum according to the item (5) or (6), wherein each of the folding-back rollers is provided with roller rotational speed restricting means for restricting a roller rotational speed correspondingly to this speed.

Since a folding back resistance is large at an initial stage of folding back and a folding back resistance is small at a final stage of folding back in folding back the carcass band side portion by the folding-back means, the speed of the tip end of each arm, i.e., the rotational speeds of the associated rollers are increased at those portions of the carcass band side portion where the folding back resistance is small thereby shortening a time where the rollers stay on the carcass band side portion per unit length thereof, thereby possibly causing a problem that the carcass band side portion is not sufficiently pressure-jointed. However, according to this tire building drum, there is provided the roller rotational speed restricting means for restricting the roller rotational speed correspondingly to this speed, thereby enabling prevention of this problem.

(8) The present invention further provides a tire building drum according to any one of the items (1) through (7), wherein the core body is provided by one in number and arranged in-between the pair of bead lock means; and wherein the tire building drum further comprises: a pair of sleeves adapted to be displaced toward and away from each other on the center shaft; sleeve reciprocative driving means for displacing the sleeves; and link mechanisms having one ends coupled to the rigid support members, respectively, and the other ends coupled to the pair of sleeves, respectively, the link mechanisms being each adapted with a pair of links having intermediate portions hinged to each other, respectively.

With such a tire building drum, the rigid support members are displaced and radially expanded or contracted by the pair of sleeves to be displaced away from or close to each other and by the link mechanisms coupled to the sleeves, respectively, so that axial center positions of the rigid support members are precisely kept unchanged and even before and after expansion or contraction, and further, the core body is provided by one in number so that the core body is adapted to support the carcass band over a full width thereby allowing a solid bonding surface for tire component members.

(9) The present invention further provides a tire building drum according to the item (8), wherein the sleeve reciprocative driving means is adapted with: screw portions formed at end portions of the sleeves, respectively, and having mutually opposite lead orientations for the right and left sleeves, respectively; screw blocks threadedly engaged with the screw portions, respectively; and rotating means for relatively rotating the sleeves and the associated screw blocks, respectively;

wherein the tire building drum further comprises: sliders having mounted thereon the bead lock means, respectively, and adapted to displace the bead lock means toward and away from each other; and bead lock reciprocative driving means for displacing the pair of bead lock means; and wherein the bead lock reciprocative driving means is adapted with: female screw members coupled to radial insides of the sliders, respectively; a screw shaft disposed in a hollow of the center shaft and having right and left male screw portions threadedly engaged with the associated female screw members, respectively; and screw shaft rotating means for rotating the screw shaft;

in which the right and left male screw portions of the screw shaft have mutually opposite lead orientations, respectively.

With such a tire building drum, the sleeve reciprocative driving means is adapted with the oppositely oriented screw portions formed on the sleeves, respectively, and with the screw blocks threadedly engaged with the screw portions, respectively, so that the pair of sleeves can be displaced close to and away from each other precisely and intendedly, and so that the rigid support members to be expanded or contracted by displacement of the sleeves can be easily, rapidly displaced to be expanded or contracted and positioned to predetermined radial positions of the building drum with high precision in conformity to a size of tire to be molded, with a simple mechanism; and the bead lock reciprocative driving means is adapted with the female screw members coupled to the sliders, respectively, and the screw shaft disposed in the hollow of the center shaft and having right and left male screw portions threadedly engaged with the associated female screw members, respectively, so that the axial center positions of the bead lock means can be held with high accuracy while allowing the right and left bead lock means to be displaced to each other to a predetermined spacing and to be precisely positioned, with a compact mechanism.

(10) The present invention also provides a tire building drum according to the item (8), further comprising: means for restraining rotation of the screw blocks; and means for rotating, together with the sleeves, the center shaft fitted through the sleeves by circumferential convex and concave.

With such a tire building drum, the center shaft is rotated in a state where the screw blocks are fixed by the rotation restraining means for the screw blocks, so that the sleeves can be rotated integrally with the center shaft under operation of concave and convex fitting portions while the screw portions provided on the sleeves axially displaceable relative to the center shaft can be rotated synchronizedly with each other relative to the screw blocks, respectively, thereby enabling both sleeves to be displaced close to or away from each other by distances corresponding to a rotated amount of the center shaft in relation to screw pitches of the screw portions.

(11) The present invention also provides a tire building drum according to the item (9), further comprising: means for rotating both the screw blocks synchronizedly with each other; and means for fitting the sleeves onto the center shaft by circumferential convex and concave.

With such a tire building drum, the screw blocks are rotated synchronizedly with each other, thereby allowing the pair of sleeves to be displaced close to or away from each other by distances corresponding to rotated amounts of the screw blocks, respectively.

(12) The present invention also provides a tire building drum according to the item (10) or (11), further comprising: means for restricting rotation of the screw blocks relative to the center shaft.

With such a tire building drum, after both sleeves are displaced close to or away from each other, there is released restraint of the rotation restraining means for the screw blocks, if any, and the means for restricting rotation of the screw blocks relative to the center shaft is operated, thereby allowing the positions of the screw blocks relative to the center shaft to be kept constant, so that the positions of the sleeves concave and convex fitted to the center shaft relative to the screw blocks are kept constant, and thus positions of the pair of sleeves relative to each other in an axial direction can be kept constant.

(13) The present invention further provides a tire building drum according to the item (8), wherein the sleeve reciprocative driving means is adapted with: female screw members coupled to the sleeves at radial insides thereof, respectively; a screw shaft disposed in a hollow of the center shaft and having right and left male screw portions threadedly engaged with the associated female screw members, respectively; and screw shaft rotating means for rotating the screw shaft; in which the right and left male screw portions of the screw shaft have mutually opposite lead orientations, respectively;

wherein the tire building drum further comprises: sliders having mounted thereon the bead lock means, respectively, and adapted to displace the bead lock means toward and away from each other; and bead lock reciprocative driving means for displacing the pair of bead lock means; and wherein the bead lock reciprocative driving means is adapted with: screw portions formed at end portions of the sliders, respectively, so as to have mutually opposite screw thread extending directions for the right and left sliders, respectively; screw blocks threadedly engaged with the screw portions, respectively; and rotating means for rotating the sliders and the screw blocks relative to each other.

With such a tire building drum, the sleeve reciprocative driving means is adapted with: female screw members coupled to the sleeves at radial insides thereof, respectively; a screw shaft disposed in a hollow of the center shaft and having right and left male screw portions threadedly engaged with the associated female screw members, respectively, so that the pair of sleeves can be displaced close to and away from each other precisely and intendedly, and so that the rigid support members to be expanded or contracted by displacement of the sleeves can be easily, rapidly displaced to be expanded or contracted and positioned to predetermined radial positions of the building drum with high precision in conformity to a size of tire to be molded, with a compact mechanism; and the bead lock reciprocative driving means is adapted with the oppositely oriented screw portions formed at the sliders, respectively, and the screw blocks threadedly engaged with the screw portions, respectively, so that the axial center positions of the bead lock means can be held with high accuracy while allowing the right and left bead lock means to be displaced to each other to a predetermined spacing and to be precisely positioned, with a simple mechanism.

(14) The present invention also provides a tire building drum according to the item (13), further comprising: means for restraining rotation of the screw blocks; and means for rotating, together with the sliders, the center shaft fitted through the sliders by circumferential convex and concave.

With such a tire building drum, the center shaft is rotated in a state where the screw blocks are fixed by the rotation restraining means for the screw blocks, so that the sliders can be rotated integrally with the center shaft under operation of concave and convex fitting portions while the screw portions provided on the sliders axially displaceable relative to the center shaft can be rotated synchronizedly with each other relative to the screw blocks, respectively, thereby enabling both sliders to be displaced close to or away from each other by distances corresponding to a rotated amount of the center shaft in relation to screw pitches of the screw portions.

(15) The present invention also provides a tire building drum according to the item (13), further comprising: means for rotating both the screw blocks synchronizedly with each other; and means for fitting the sliders onto the center shaft by circumferential convex and concave.

With such a tire building drum, the screw blocks are rotated synchronizedly with each other, thereby allowing the pair of sliders to be displaced close to or away from each other by distances corresponding to rotated amounts of the screw blocks, respectively.

(16) The present invention also provides a tire building drum according to the item (14) or (15), further comprising: means for restricting rotation of the screw blocks relative to the center shaft.

With such a tire building drum, after both sliders are displaced close to or away from each other, there is released restraint of the rotation restraining means for the screw blocks, if any, and the means for restricting rotation of the screw blocks relative to the center shaft is operated, thereby allowing the positions of the screw blocks relative to the center shaft to be kept constant, so that the positions of the sliders concave and convex fitted to the center shaft relative to the screw blocks are kept constant, and thus positions of the pair of sliders relative to each other in an axial direction can be kept constant.

(17) The present invention further provides a tire building drum according to any one of the items (1) through (7), wherein the core bodies are provided by two in number, and the core bodies are arranged near axial insides of the pair of bead lock means, respectively;

wherein the tire building drum further comprises: a pair of sliders having mounted thereon the core bodies and the bead lock means located at the axially same sides as the sliders, respectively; slider reciprocative driving means for displacing the sliders, respectively; and core-body expanding/contracting means for expanding or contracting the core bodies, respectively; and wherein each of the core-body expanding/contracting means is adapted with: expanding/contracting link parts coupled to the rigid support members constituting the associated core body, respectively; a screw block restrained in axial displacement and adapted to be rotatable relative to the center shaft; a longitudinal movement screw member threadedly engaged with the screw block so as to be restrained in rotation about the center shaft, and adapted to be axially displaceable; and a link uniting part for coupling the expanding/contracting link parts to the longitudinal movement screw member.

With such a tire building drum, each of the core-body expanding/contracting means is constituted in the above manner, so that axial center positions of the rigid support members are unchanged precisely and even before and after expansion or contraction, and further, the core bodies are provided by two in number adapted with right and left ones so that tires having different widths can be molded on the same building drum by simply varying a distance between the core bodies, thereby allowing laborious work for exchanging building drums to be omitted upon producing various sizes of tires having different widths, respectively.

(18) The present invention further provides a tire building drum according to the item (17), wherein the slider reciprocative driving means are adapted with: female screw members coupled to the sliders at radial insides thereof, respectively; a screw shaft disposed in a hollow of the center shaft and having right and left male screw portions threadedly engaged with the female screw members, respectively; and screw shaft rotating means for rotating the screw shaft; in which the right and left male screw portions of the screw shaft have mutually opposite leads, respectively.

With such a tire building drum, the slider reciprocative driving means are adapted with: female screw members coupled to the sliders, respectively; and the screw shaft disposed in a hollow of the center shaft and having right and left male screw portions threadedly engaged with the female screw members, respectively; so that the axial center positions of the bead lock means and the core bodies can be held with high accuracy while allowing the right and left bead lock means and the core bodies to be displaced to each other to predetermined spacings and to be precisely positioned, respectively, with a compact mechanism.

(19) The present invention also provides a tire building drum according to the item (17) or (18), further comprising: means for restraining rotation of the screw blocks; and means for rotating, together with the sliders, the center shaft fitted through the sliders by circumferential convex and concave.

With such a tire building drum, the center shaft is rotated in a state where the screw blocks are fixed by the rotation restraining means for the screw blocks, so that the sliders can be rotated integrally with the center shaft under operation of concave and convex fitting portions while the screw portions provided on the sliders axially displaceable relative to the center shaft can be rotated synchronizedly with each other relative to the screw blocks, respectively, thereby enabling both sliders to be displaced close to or away from each other by distances corresponding to a rotated amount of the center shaft in relation to screw pitches of the screw portions.

(20) The present invention also provides a tire building drum according to the item (17) or (18), further comprising: means for rotating both the right and left screw blocks synchronizedly with each other; and means for fitting the sliders onto the center shaft by circumferential convex and concave.

With such a tire building drum, the screw blocks are rotated synchronizedly with each other, thereby allowing the pair of sliders to be displaced close to or away from each other by distances corresponding to rotated amounts of the screw blocks, respectively.

(21) The present invention also provides a tire building drum according to the item (19) or (20), further comprising: means for restricting rotation of the screw blocks relative to the center shaft.

With such a tire building drum, after both sliders are displaced close to or away from each other, there is released restraint of the rotation restraining means for the screw blocks, if any, and the means for restricting rotation of the screw blocks relative to the center shaft is operated, thereby allowing the positions of the screw blocks relative to the center shaft to be kept constant, so that the positions of the sliders concave and convex fitted to the center shaft relative to the screw blocks are kept constant, and thus positions of the pair of sliders relative to each other in an axial direction can be kept constant.

(22) The present invention further provides a tire building method using the tire building drum of any one of the items (1) through (21), comprising steps of:
  locking bead cores by the bead lock means, respectively;
  then bulging a center portion of a carcass band while displacing the bead lock means close to each other;
  folding back side portions of the carcass band to radial outsides around the bead cores, respectively;
  thereafter radially expanding the core body to a maximum diameter, while locking the bead cores; and
  assembling tire component members onto the radially expanded core body.

With such a tire building method, upon assembling tire component members such as a belt member, tread rubber, sidewall rubbers and the like onto an outside of a bulged carcass band center portion, these component members are directly assembled on a building drum having previously arranged thereon the carcass band while locking the bead cores in a manner that these tire component members are assembled based on the core body, thereby enabling precise assembling of the tire component members, with high precision in positions of the tire component members relative to both bead cores. It is noted that the carcass band here means a combination of tire component members including a carcass member laminated into a band shape.

(23) The present invention further provides a tire building method using the tire building drum according to any one of the items (5) through (21), comprising a step of:

moving the folding-back arms of the folding-back means to axial insides synchronizedly with each other, respectively, to synchronizingly swing to radial outsides the folding-back arms around proximal ends thereof against swinging forces by the urging means while causing the folding-back rollers to be rolledly contacted with carcass band side portions, respectively, to thereby fold back the carcass band around the bead cores.

With such a tire building method, folding back is conducted by moving the folding-back arms to the axial insides synchronizedly with each other, so that folding back can be uniformly conducted over an entire circumference, and by virtue of the urging means, carcass band side portions can be pressure-jointed to a carcass band center portion at a sufficient strength.

(24) The present invention further provides a tire building method according to the item (23), wherein the folding-back arms are synchronizedly swung to radial outsides, respectively, such that side portions of the carcass band to be folded back by the folding-back means are rolledly pressure-jointed to a carcass band center portion by any one of the folding-back rollers at any point of the side portions of the carcass band.

With such a tire building method, side portions of the carcass band are pressure-jointed to a carcass band center portion by any one of the folding-back rollers at any point of the side portions of the carcass band, so that close contact of the carcass band side portions with the carcass band center portion is ensured to avoid relative displacement between them during tire production, thereby achieving high dimensional precision of a tire.

(25) The present invention also provides a tire building method using the tire building drum according to any one of the items (8) through (16), further comprising a step of: radially expanding the core body to a position where at least side surfaces of the core body are opposed to the bead cores, respectively, and then folding back the carcass band side portions around the bead cores, respectively.

With such a tire building method, bead cores and tire portions therearound can be supported from axial insides thereof by the side surfaces of the core body having high rigidity, so that carcass band side portions can be tightly folded back around bead cores, thereby enabling molding of a tire having an excellent bead firmness.

(26) The present invention also provides a tire building method according to the item (25), further comprising a step of: radially expanding the core body to a position where side surfaces of the core body are opposed to the bead cores, respectively, and thereafter displacing the bead lock means to an axial center to bring the bead lock means close to core body side surfaces, respectively, thereby starting folding back of the carcass band side portions.

With such a tire building method, the core body is radially expanded to a position where side surfaces of the core body are opposed to the bead cores, respectively, and thereafter the bead lock parts are moved to an axial center, so that spacings between the bead lock parts and the core body can be minimized, thereby allowing the bead cores to be more assuredly supported by the side surfaces of the core body.

(27) The present invention also provides a tire building method according to the item (26), further comprising a step of: folding back the carcass band side portions by the folding-back rollers while urging the carcass band side portions toward the carcass band center portion supported by core body side portions.

With such a tire building method, the carcass band side portions are folded back by the folding-back rollers while urging the carcass band side portions toward the carcass band center portion supported by core body side portions, so that close contact of the carcass band side portions with the carcass band center portion is ensured to thereby attain high dimensional precision of a tire.

(28) The present invention also provides a tire building method according to any one of the items (25) through (27), further comprising a step, after folding back the carcass band side portions around the bead cores, respectively, of pressure-jointing folded back end portions by stitching rollers each subjected to a knurling treatment.

With such a tire building method, the folded back ends are pressure-jointed by the stitching rollers each subjected to a knurling treatment, so that occurrence of separation from the tire folded back ends can be assuredly prevented.

(29) The present invention also provides a tire building method according to any one of the items (25) through (28), further comprising a step of: gradually reducing a pressure within the center bladder, as an interior of the center bladder is pressurized to bulge a center portion of the carcass band and as the core body is radially expanded to a maximum diameter.

With such a tire building method, the core body is radially expanded to the maximum diameter while gradually reducing the pressure within the bladder, so that the core body can be radially expanded smoothly though radial expansion of the core body was difficult if such a pressure reduction was not conducted.

(30) The present invention also provides a tire building method according to any one of the items (25) through (29), further comprising steps of:

detecting a load of a motor for driving the sleeve reciprocative driving means upon radially expanding the core body; and controlling at least one of an internal pressure of the center bladder, and a spacing between the pair of bead lock means, based on a value of the load.

With such a tire building method, there is controlled an internal pressure of the center bladder or a spacing between the right and left bead lock means by detecting a load of the motor for driving the sleeve reciprocative driving means as a property alternative to a resistance force upon radially expanding the core body, thereby allowing a smooth radial expansion of the core body to be further ensured.

BRIEF DESCRIPTION OF THE DRAWINGS

FIG. 1 is a cross-sectional view of a tire building drum according to a first embodiment of the present invention.

FIG. 12 is a cross-sectional view of a tire building drum according to a second embodiment of the present invention.

FIG. 22 is a cross-sectional view of screw shaft origin posture holding means.

BEST MODE FOR CARRYING OUT THE INVENTION

Figure 2A:
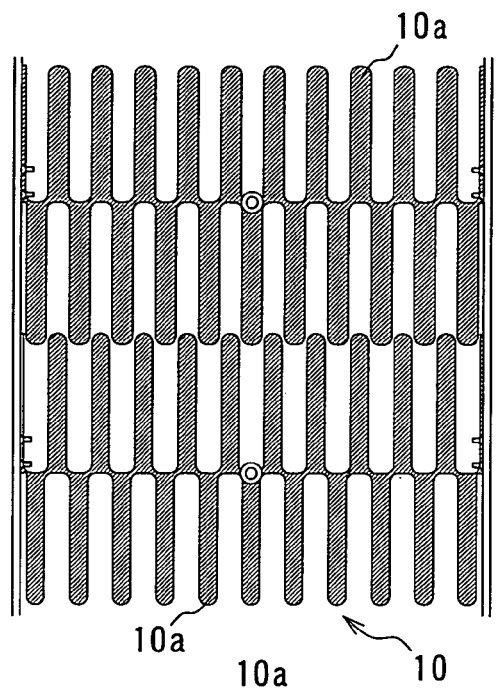
FIG. 2 is a view showing the manner of radial expansion or contraction of a core body and links.

There will be explained embodiments of the present invention with reference to the accompanying drawings. FIG. 1 is a schematic cross-sectional view of substantially half of a tire building drum according to a first embodiment of the present invention, including a center axis of the tire building drum.

This building drum 1 is provided with a pair of sleeves 3 to be displaced toward and away from each other in an axial direction on a center shaft 2. Provided at an outer peripheral surface of each sleeve 3 is an associated slider 4 to be displaced toward and away from each other on a center axis of the associated sleeve 3 and independently of the sleeve 3. Fixedly provided on an outer periphery of each slider 4 is associated bead lock means 7 for lockingly supporting an associated bead core, and each bead lock means 7 comprises: bead lock segments 71 which are circumferentially neighbored to each other to be expanded or contracted in an annular shape; associated links 72 having one ends hinged to the bead lock segments 71, respectively; bead lock pistons 73 coupled to other ends of the links 72, respectively, and provided in an axially displaceable manner; and bead lock cylinders 74 fixed on the outer periphery of the associated sleeve 3 and adapted to displace the associated bead lock pistons 73, respectively.

Provided at an axial center between both bead lock means 7 is one core body 10 to be expanded or contracted in a radial direction, and this core body 10 is adapted with a plurality of sheets of rigid support members 10a each in a semicylindrical shape and each having comb tooth portions which are mutually engaged to establish a toroidal shape, in a manner that each rigid support member 10a is coupled with one end of an associated link mechanism 11 comprising a pair of links 11a having intermediate portions hinged to each other, and that other end portions of each link mechanism 11 are mounted on the associated pair of sleeves 3, respectively, while sleeve reciprocative driving means to be described later are mounted on the pair of sleeves 3 for displacing the same, respectively.

The building drum 1 further comprises: folding-back means 8 provided at the right and left sliders 4, respectively; and a center bladder 9 comprising a reinforced rubber membrane which extends to a radial outside of the core body 10 to hermetically seal a space around the core body 10 and which is deformed and thereby expanded or contracted in a toroidal manner; such that both axial side portions of the center bladder 9 are fixed to axial inside ends of the sliders 4 at positions axially inside and near the bead lock means 7, respectively. Based on this configuration, both axial side portions of the center bladder 9 are displaced toward and away from each other, integrally with the bead lock means 7 at the axially same sides as the both axial side portions of the center bladder 9, respectively.

FIG. 1a shows a state where the core body 10 has been radially expanded, and the pair of bead lock means 7 have been displaced close to each other, and FIG. 1b shows a state where the core body 10 has been radially contracted and the bead lock means 7 have been displaced away from each other.

To displace the paired bead lock means 7 close to each other, the associated sliders 4 are displaced close to each other. Further, to displace to radially expand the bead lock segments 71, the associated bead lock pistons 73 are axially inwardly displaced to thereby radially expand those end portions of the associated links 72 which are at the bead lock segments 71, respectively.

Here, bead lock reciprocative driving means for displacing the paired bead lock means 7 close to each other, is adapted with: female screw members 41 coupled, through coupling members 42, to radial insides of sliders 4 having bead lock means 7 installed thereon, respectively; a screw shaft 50 disposed in a hollow of the center shaft 2 and having right and left male screw portions 51 threadedly engaged with the associated female screw members 41, respectively; and screw shaft rotating means (not shown) for rotating the screw shaft 50; in which the right and left male screw portions 51 of the screw shaft 50 have mutually opposite lead orientations, respectively. Based on this configuration, the screw shaft 50 is rotated by the screw shaft rotating means to displace the female screw members 41 toward and away from each other in a left-right symmetric manner, thereby allowing the paired bead lock means 7 installed on the sliders 4 to be precisely displaced toward and away from each other. It is noted that the center shaft 2 and sleeves 3 are formed with elongated through-holes 2a, 3a, respectively, for allowing the coupling members 42 to penetrate therethrough, respectively.

In case of radially expanding the core body 10, the sleeves 3 are displaced close to each other by the associated reciprocative driving means, respectively, to thereby displace end portions of each pair of links 11a coupled to the sleeves 3, close to each other. Thus, that end portion of each link mechanism 11 which is located at the associated rigid support member 10a, is displaced to be radially expanded together with the rigid support member 10a and to be held in position.

Figure 2B:
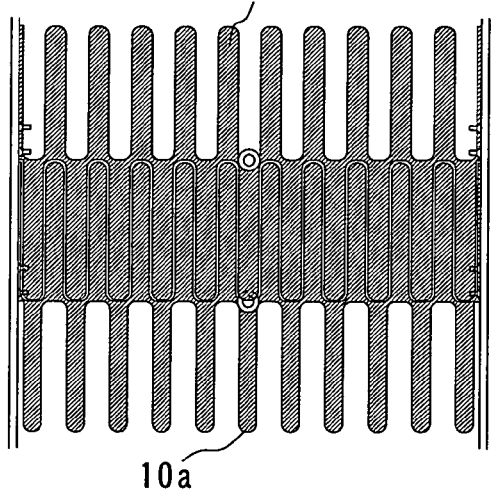
Figure 2C:
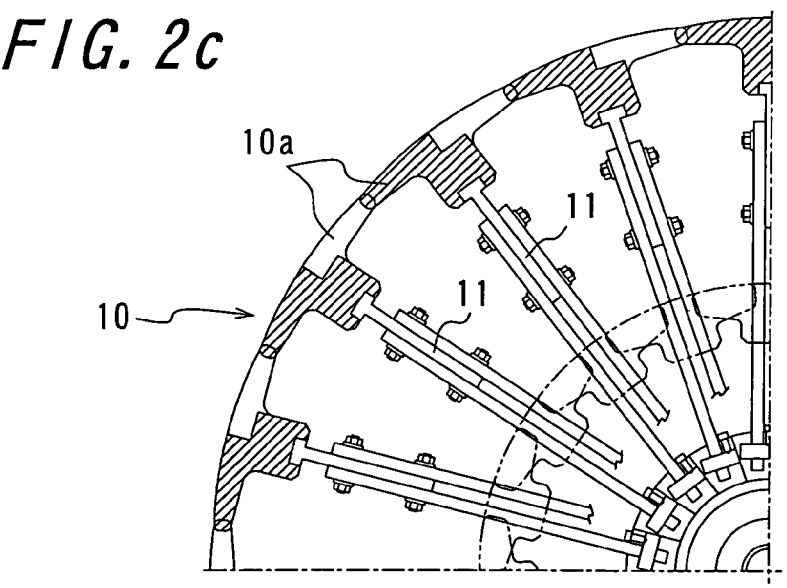

FIG. 2 is a view showing the manner of a radial expansion or contraction of the core body 10 and link mechanisms 11, in which FIG. 2a is a radial view of the core body 10 radially expanded to a maximum diameter, FIG. 2b is a radial view of the core body 10 when radially contracted, and FIG. 2c is an axial view of the core body. FIG. 2c shows a state radially expanded to the maximum diameter in a solid line, and a radially contracted state in a two-dot chain line. The rigid support members 10a constituting the core body 10 each include comb tooth portions, are equidistantly arranged in a circumferential direction, and establish such a structure that the opposing comb tooth portions of neighboring rigid support members 10a are engaged with each other, respectively. This enables a shaped carcass band to be supported by virtue of rigidity of the rigid support members from an inside of the center bladder 9 over a range from a state radially expanded to the maximum diameter up to a radially contracted state, thereby allowing a belt member and a tread rubber to be precisely assembled onto an outer periphery of the carcass band. Further, at a position during radial expansion, side surfaces of the shaped carcass band can be supported from an axial inside by virtue of rigidity of the side surface of the rigid support members 10a, thereby enabling carcass band side portions to be assuredly pressure-jointed to tire component members including bead cores upon folding back the carcass band side portions, so that bead firmness is improved.

As shown in FIG. 1, reciprocative driving means for the sleeves 3 may be adapted with: screw portions 12 formed at end portions of the sleeves 3, respectively, and having mutually opposite screw thread extending directions for the right and left sleeves 3, respectively; screw blocks 13 threadedly engaged with the screw portions, respectively; and rotating means (not shown) for relatively rotating the sleeves 3 and the associated screw blocks 13, respectively. In this case, provided at end portions of the center shaft 2 are stoppers 14 for restricting axial displacements of the screw portions 12 of sleeves 3, respectively.

Although the screw portions 12 and screw blocks 13 in FIG. 1 are adapted with male screws and female screws, respectively, reverse combinations are possible.

In this way, there is adopted the screw mechanism which is simpler and has high versatility so that the pair of sleeves 3 are precisely displaced close to and away from each other on the center shaft 2 of the tire building drum to thereby displace end portions of the pairs of links 11a coupled to the associated sleeves 3, respectively, close to and away from each other, thereby enabling the rigid support members 10a to be displaced for expansion or contraction together with those end portions of the links 11a which are located at the associated rigid support members 10a, and as a result, the rigid support members 10a can be held in arbitrary radial positions of the building drum 1 with high precision in conformity to a size of tire to be molded, thereby enabling assembling of belt member, tread rubber and the like with high precision.

Figure 3A:
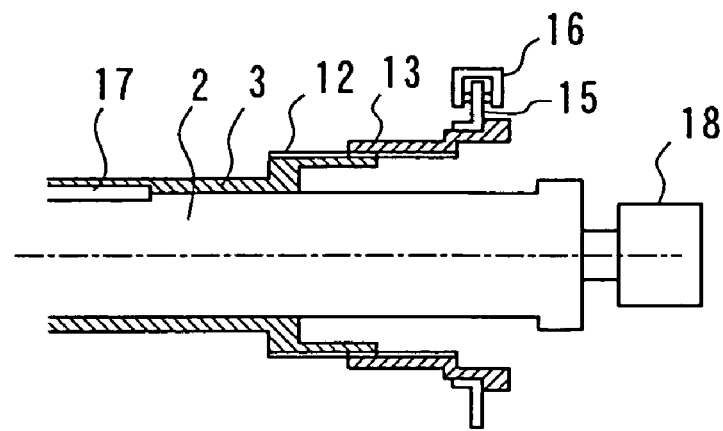
FIG. 3 is a cross-sectional view of an example of reciprocative driving means for a sleeve.

Preferably, as shown in FIG. 3a, as rotation restraining means for each screw block 13, there are provided: a brake disks 15 disposed at an outer periphery of the screw block 13; a brake 16 disposed at an outer periphery of the brake disk and having a base portion fixed to the ground; a key 17 for fitting the sleeve 3 onto the center shaft 2 of the building drum 1 in a relatively displaceable manner in an axial direction; and means 18 such as a stepping motor for rotating the center shaft 2 and disposed at the end portion thereof. It is noted that spline fitting or serration fitting is possible instead of the key fitting.

Based on the above, the center shaft 2 is rotated in a state where screw block 13 are fixed by the associated brakes 16 as the rotation restraining means for the screw blocks 13, so that the sleeves 3 fitted by the key 17 onto the center shaft 2 in the relatively displaceable manner in the axial direction are rotated relative to the right and left female screw members 13, respectively, thereby enabling the pair of sleeves 3 to be displaced close to or away from each other by distances corresponding to a rotated amount of the center shaft 2.

Figure 3B:
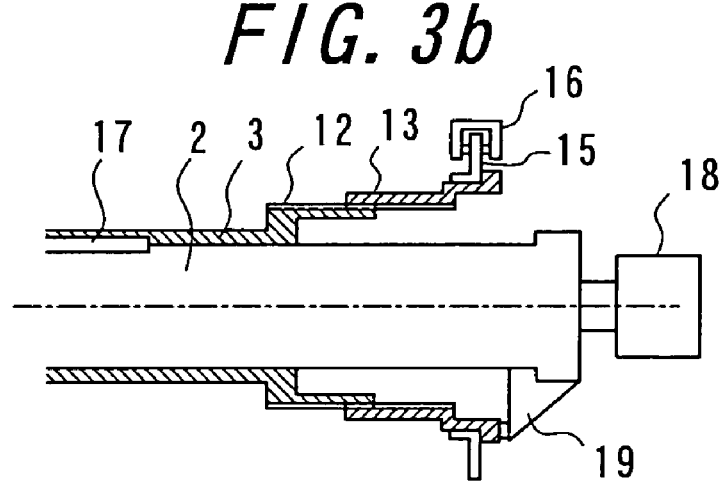

More preferably, as shown in FIG. 3b, there is provided a single-sided brake 19 adjacent to the associated screw block 13 and having a base portion fixed to the center shaft end portion of the building drum 1. In this way, by releasing the brake 16 having the base portion fixed to the ground and by operating the single-sided brake 19 having the base portion fixed to the center shaft end portion of the building drum, the position of the screw block 13 relative to the center shaft 2 can be kept constant, so that positions of the pair of sleeves 3 relative to each other in an axial direction can be kept constant.

Figure 4:
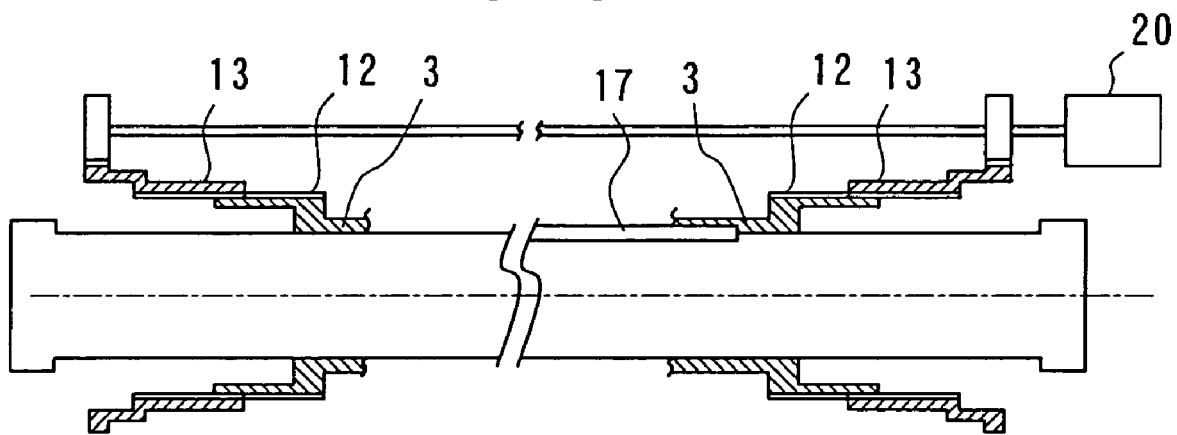
FIG. 4 is a cross-sectional view of another embodiment of reciprocative driving means for the sleeve.

Alternatively, as shown in FIG. 4, the reciprocative driving means for the sleeves 3 are adapted with: screw portions 12 formed at end portions of the sleeves 3, respectively; screw blocks 13 threadedly engaged with the screw portions, respectively; and means 20 comprising a combination of stepping motor and gear mechanism, for example, for rotating the screw blocks 13 in a synchronized manner; in which the sleeves 3 are fitted onto the center shaft 2 of the building drum 1 by a key 17 in a relatively displaceable manner in an axial direction. It is also possible here to employ spline fitting or serration fitting instead of the key fitting.

In this case, the screw blocks 13 are rotated synchronizedly with each other so that the pair of sleeves 3 can be displaced close to or away from each other by distances corresponding to rotated amounts of the screw blocks 13, respectively.

Also by such a configuration, the pair of sleeves 3 are precisely displaced close to and away from each other on the center shaft 2 of the building drum 1, thereby allowing the rigid support members 10a to be positioned at arbitrary radial positions of the building drum 1 with high precision in conformity to a tire size.

Here, the core body 10 is preferably and constantly mounted on the building drum 1 except for a situation where the core body 10 is to be disassembled and detached from the building drum for maintenance, for example, such that it becomes unnecessary to take account of readiness upon detaching and attaching the core body 10 from and to the center shaft so that the sleeves 3 having the core body 10 mounted thereon and reciprocally displaced on the center shaft are allowed to maintain high positional precision relative to the center shaft 2, and this results in that positions of bead cores relative to the tread rubber, belt member, and the like to be formed on the core body 10 are made highly precise to thereby allow for molding of a highly precise tire as compared with a building drum adapted such that the core body 10 is detached from the center shaft 2 each time a tire is molded.

Figure 5:
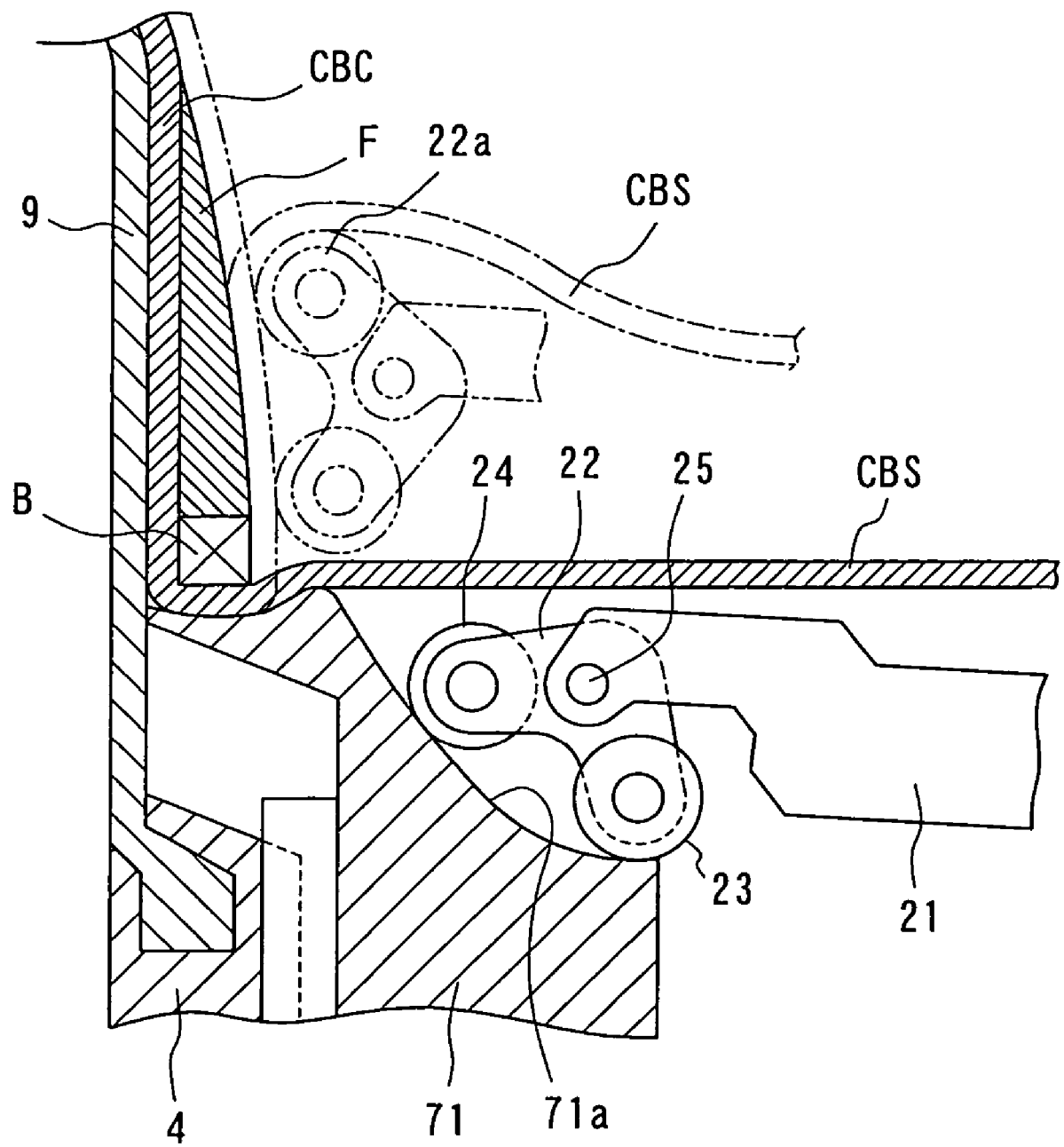
FIG. 5 is a front view of a tip end portion of a folding-back arm of folding-back means.
Figure 6:
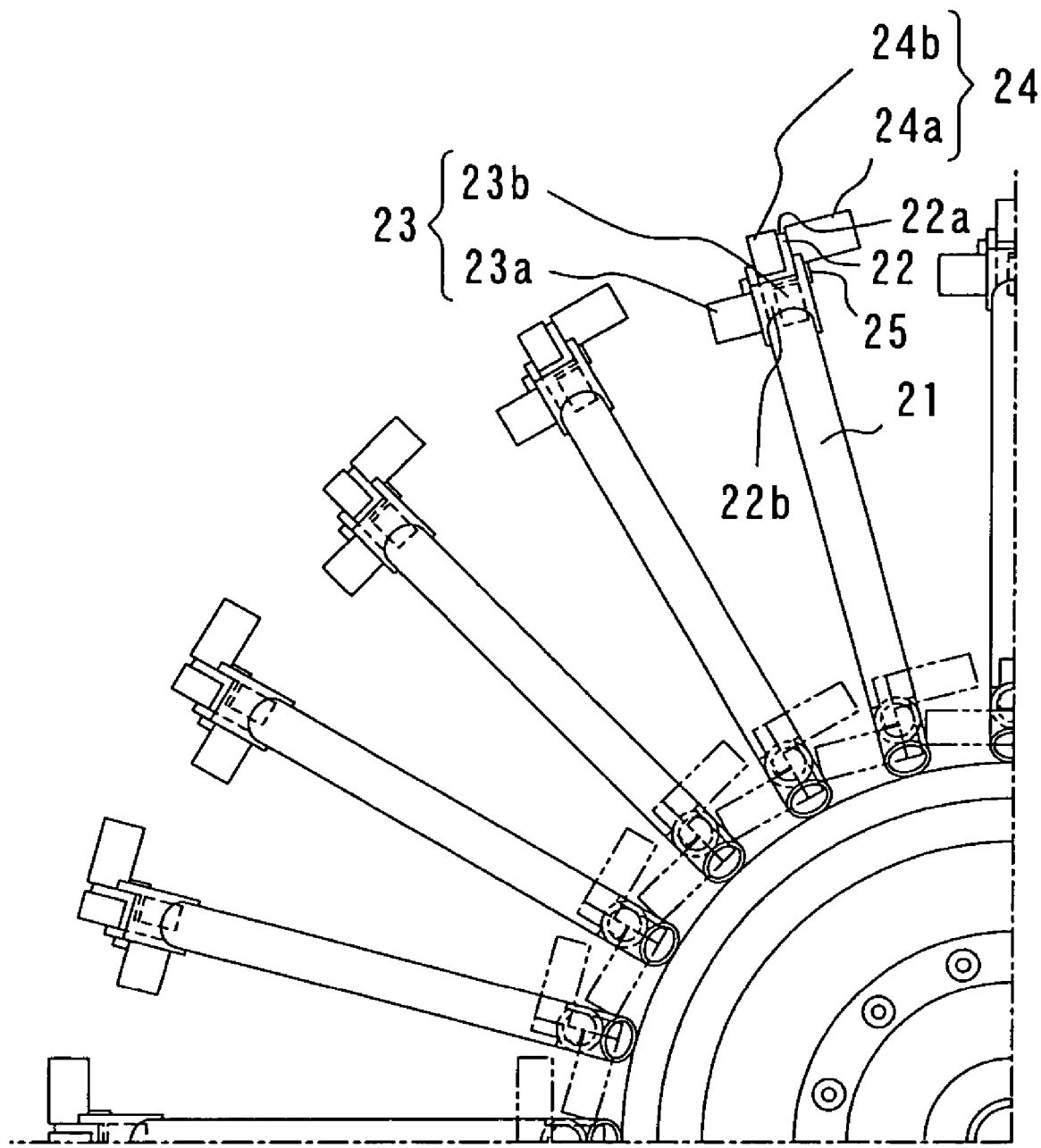
FIG. 6 is an axial side view of the folding-back arms.

There will be now explained the configuration and operation of each folding-back means 8, with reference to FIG. 1, FIG. 5 illustrating details of a tip end portion of a folding-back arm 21 of a folding-back means 8 in a front view, and FIG. 6 illustrating the manner of radial expansion or contraction of the folding-back arms 21 viewed from an axial direction. It is noted that FIG. 5 illustrates a state in a solid line where a tip end of the folding-back arm 21 is radially contracted and a state in a two-dot chain line where the tip end is radially expanded to an intermediate radius, and FIG. 6 illustrates a state in a solid line where tip ends of the folding-back arms 21 are radially expanded and a state in a two-dot chain line where the tip ends are radially contracted.

Each folding-back means 8 comprises: a common slide ring 30 which is to be axially and reciprocally displaced on a periphery of the associated slider 4 and which has a displacement range to be defined by a stopper 32 provided on the slider 4; folding-back arms 21 radially swingably mounted, through swing pins 37, on brackets 33 circumferentially equidistantly provided on an outer peripheral surface of the slide ring 30, respectively, so as to be extended toward an axial inside; neck-turning members 22 hinged to tip end portions of the folding-back arms 21 through swing pins 25, respectively, so as to be swung in a radial direction; folding-back rollers 23, 24 to be rotated around shafts provided at longitudinal opposite end portions of the neck-turning members 22 parallelly to the associated swing pins 25, respectively; and urging means 26 comprising rubber bands 27, 28 for exerting swinging forces about proximal ends of the folding-back arms 21 and directed toward a radial inside, onto the folding-back arms 21, respectively.

The folding-back rollers 23, 24 mounted on the neck-turning member 22 of each folding-back arm 21 are arranged in a mutually offset manner in a longitudinal direction, i.e., in a radial direction or axial direction of the building drum 1, and are provided to be protruded from the associated neck-turning member 22 in a cooperative circumferential direction of the folding-back arms 21 such that protruded directions of the rollers 23, 24 are opposite to each other.

Further, the folding-back rollers 23, 24 are each divided into two portions at both sides of those portions 22a, 22b of the neck-turning member 22 which support the roller shafts for the rollers, respectively, i.e., the folding-back roller 23 is divided into a protruded roller 23a and a non-protruded roller 23b and the folding-back roller 24 is divided into a protruded roller 24a and a non-protruded roller 24b. At this time, the roller rotational shaft supporting portion 22a or 22b corresponding to one folding-back roller 24 or 23 has a circumferentially extended area positioned within a circumferentially extended area of the other folding-back roller 23 or 24.

The slide ring 30 of the thus adapted each folding-back means 8 has an axially outer end to be urged by a driving mechanism (not shown), and is thus displaced toward an axial center. The rollers 23, 24 are stationarily placed on a sloped surface 71a of each bead lock segment 71 in a state where a tip end of the associated folding-back arm 21 is radially contracted. However, when the slide ring 30 is displaced toward the axial center, the rollers 23, 24 are moved toward a radial outside along the sloped surface 71a, and, in a state where a carcass band center portion CBC is bulged, further moved toward the radial outside beyond the sloped surface 71a and along a carcass band outer contour.

On this occasion, forces toward a radial inside are exerted on the folding-back arms 21 by the associated urging means 26 comprising the rubber bands 27, 28, and these forces are equally distributed to the rollers 23, 24 by virtue of operations of the neck-turning member 22 provided at tip ends of the folding-back arms 21, irrespectively of an outer contour of the carcass band center portion. Further, since the rollers 23, 24 are mounted on the associated arm 21 at opposite circumferential sides in an offset manner, the roller 23 of one arm 21 protruded between neighboring folding-back arms 21 does not interfere with the roller 24 of another arm 21 even when tip end portions of the folding-back arms 21 are radially contracted and thus the neighboring tip end portions are narrowed in spacing, thereby allowing spacings between neighboring arms 21 to be minimized, and in this way, the arms 21 can be densely arranged in the circumferential direction while eliminating such a region of the carcass band side portion CBS which is not pressure-jointed by any of the rollers 23, 24 in a state where the tip end portions of the arms 21 are radially expanded, thereby enabling strong adhesion between the carcass band center portion CBC and the carcass band side portion CBS and enabling prevention of a relative displacement therebetween.

Further, the rollers 23, 24 are each divided into two portions at both sides of those portions 22a, 22b of the neck-turning member 22 which support the roller shafts for the rollers, respectively, thereby enabling prevention of a problem that, if the rollers 23, 24 are provided at only one sides of the portions 22a, 22b, respectively, there is a risk that: that portion of the carcass band side portion CBS which is stretched toward a radial outside between neighboring folding-back arms 21 during folding back, is abutted on the non-rotating supporting portion 22a and thus the carcass band side portion CBS is damaged.

At this time, the roller rotational shaft supporting portion 22a or 22b corresponding to one folding-back roller 24 or 23 has a circumferentially extended area positioned within a circumferentially extended area of the other folding-back roller 23 or 24, thereby enabling elimination of such a region of the carcass band side portion CBS which is not pressure-jointed by any of the rollers 23, 24.

It is noted that, in displacing each slide ring 30 to an axial outside, such a displacement can be conducted by operating the associated urging means 26 by terminating the operation of the external driving mechanism for driving the slide ring 30 toward an axial inside.

Figure 7:
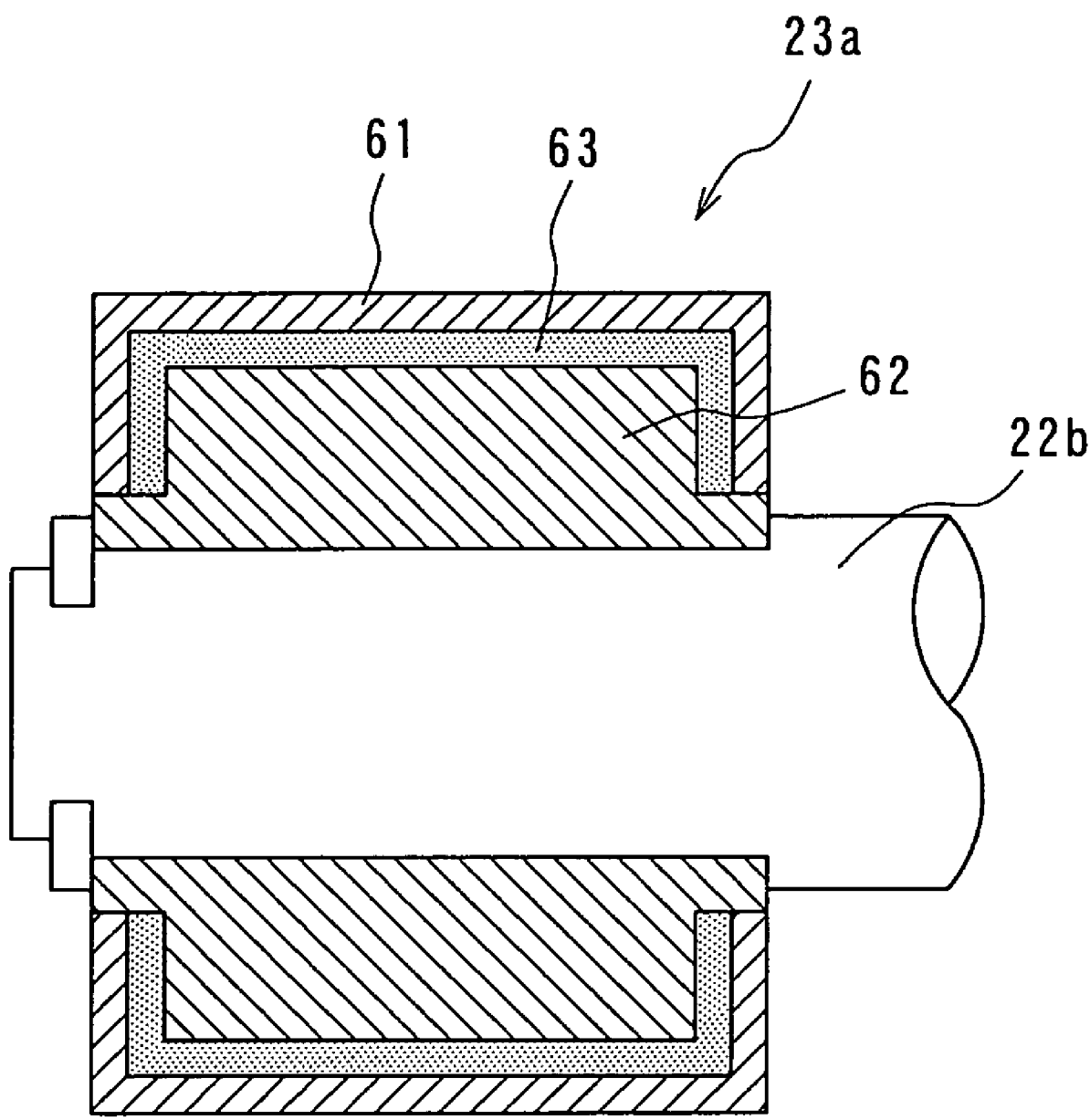
FIG. 7 is a cross-sectional view of roller rotational speed restricting means.

Further, since a folding back resistance is large at an initial stage of folding back and a folding back resistance is small at a final stage of folding back in folding back the carcass band side portion CBS by the folding-back means 8, and since each slide ring 30 is urged by a constant thrust force in the above configuration, the speed of the tip end of each arm 21, i.e., the rotational speeds of the associated rollers are increased at those portions of the carcass band side portion CBS where the folding back resistance is small thereby shortening a time where the rollers stay on the carcass band side portion CBS per unit length thereof, thereby possibly causing a problem that the carcass band side portion CBS is not sufficiently pressure-jointed. As a countermeasure thereto, it is desirable to provide roller rotational speed restricting means for restricting the roller rotational speed correspondingly to this speed. FIG. 7 is a cross-sectional view showing an example of a folding-back roller provided with the roller rotational speed restricting means which can be adapted such that the folding-back roller 23a is adapted with an outer rolling wheel 61, an inner fixing member 62, and viscous resistive fluid such as silicone oil 63 filled within a hermetically sealed space between them, and this roller 23a is fixed to the roller shaft 22b of the neck-turning member 22 by fitting a key to a key groove (both not shown), and in this case, rotational speeds of the roller are restricted by virtue of the viscosity of the viscous resistive fluid when the rotational speeds are increased, thereby enabling the rotational speed of the roller to be uniformalized.

Figure 8A:
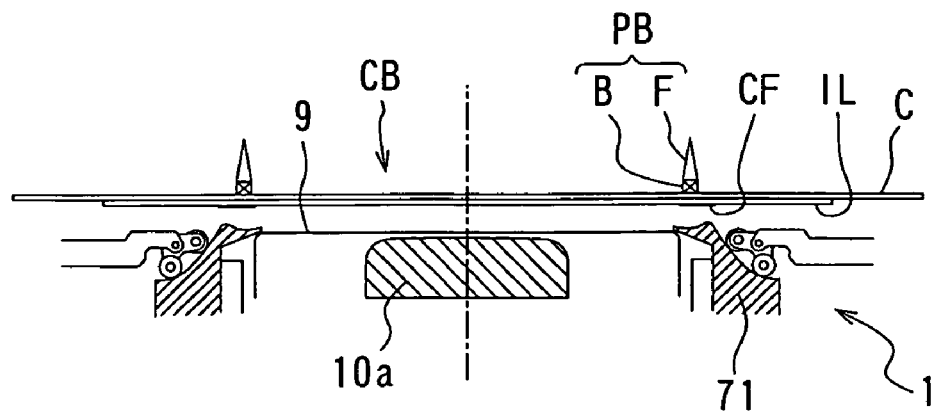
FIG. 8 is a cross-sectional view of a tire in course of molding, illustrating a tire building process corresponding to the first embodiment.
Figure 8B:
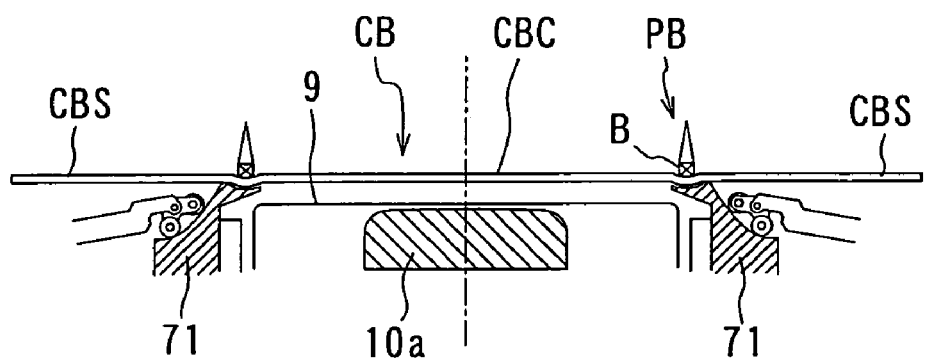
Figure 8C:
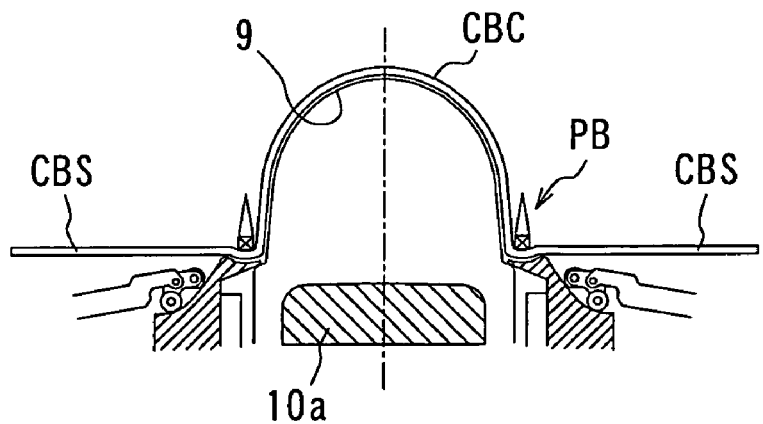

FIGS. 8 through 11 are cross-sectional views of a tire in course of molding, illustrating a tire building process using the above described tire building drum 1. In molding a tire by the building drum 1:

as shown in FIG. 8a, arranged on an outer peripheral side of the tire building drum 1 are: preset beads PB each provided by presetting a bead core B and a bead filler material F; and a carcass band CB provided by assembling members such as an inner liner member IL, canvas chafer member CF, onto a carcass member C to thereby exhibit a cylindrical shape as a whole;

as shown in FIG. 8b, then the bead lock segments 71 of the bead lock means 7 are radially expanded to lock the bead cores B, respectively, by advancingly displacing the bead lock pistons 37 shown in FIG. 1 under operation of the links 72; and as shown in FIG. 8c, a space hermetically sealed by the center bladder 9 is pressurized so that the center portion CBC of the carcass band CB extending between the bead cores B is bulged into a toroidal shape, while displacing the bead cores B close to each other under operation of the sliders 4 shown in FIG. 1, with the bead cores B locked to the corresponding bead lock segments 71, respectively.

Figure 9A:
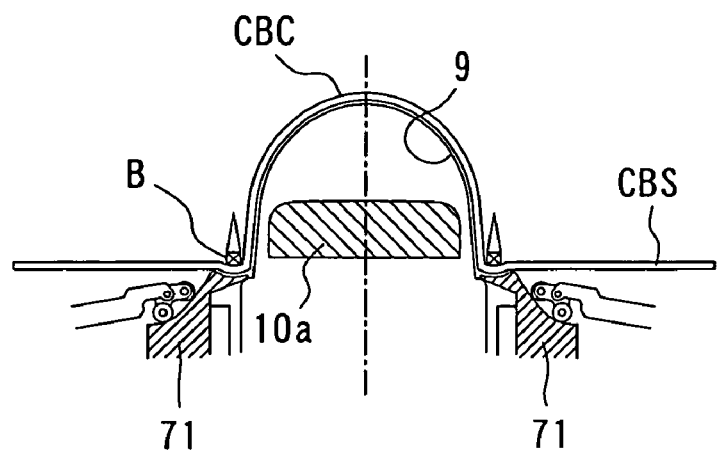
FIG. 9 is a cross-sectional view of the tire in course of molding, illustrating another molding step subsequent to FIG. 8.
Figure 9B:
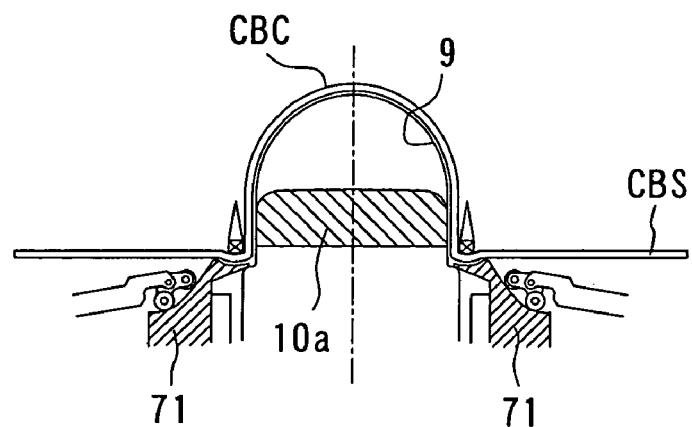
Figure 9C:
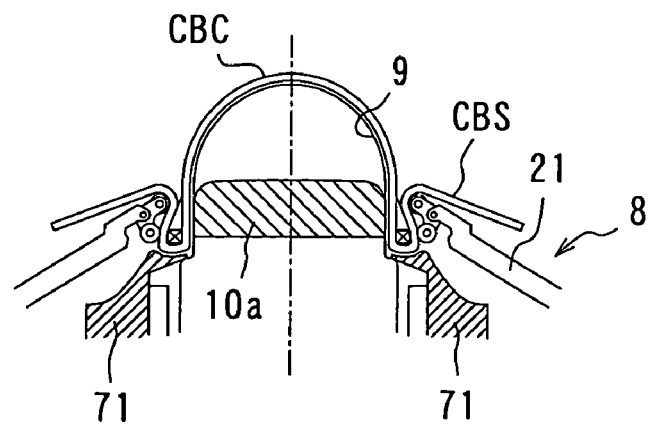

Next, as shown in FIG. 9a, the rigid support members 10a are displaced to be radially expanded to a height where the side surfaces of the rigid support members 10a correspond to radial positions of the bead cores B, respectively, and the rigid support members are held at these positions, respectively. In this state, there are provided clearances between an inner surface of the center bladder 9 and the side surfaces of the rigid support members 10a, for allowing the rigid support members 10a to be radially expanded without interference with the center bladder 9. Then, as shown in FIG. 9b, the bead lock segments 71 at both sides are displaced close to each other under operation of the sliders 4, thereby displacing the inner surface of the center bladder 9 to the side surfaces of the rigid support members 10a as close as possible, to bring the clearances therebetween to be substantially zero. Further, as shown in FIG. 9c, the folding-back means 8 are operated to thereby displace the proximal ends of the folding-back arms 21 toward the axial center, thereby starting to fold back the carcass band side portions CBS. It is noted that the steps shown in FIG. 9a and FIG. 9b are conducted for the purpose of tightly folding back the carcass band CB around the bead cores B to achieve an excellent bead firmness then.

Figure 10A:
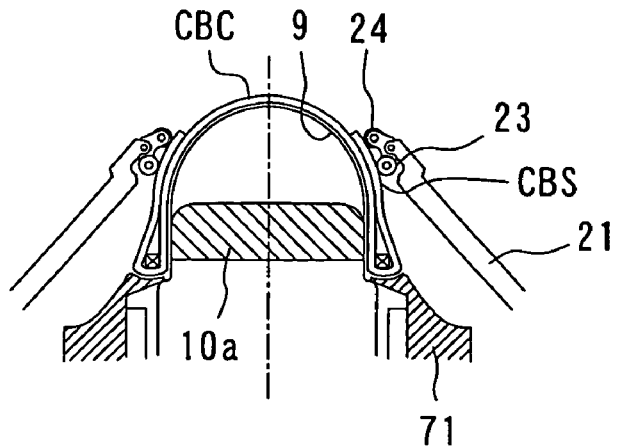
FIG. 10 is a cross-sectional view of the tire in course of molding, illustrating a further molding step subsequent to FIG. 9.

Subsequently, as shown in FIG. 10a, the folding-back rollers 23, 24 are displaced to a radial outside along an outer contour of the carcass band center portion CBC, thereby finishing folding back of the carcass band side portions CBS. In conducting such folding back, the folding-back arms 21 are provided with the associated folding-back rollers 23, 24 in the offset manner in both the circumferential direction and radial direction as described above, respectively, so that the folding-back arms 21 can be arranged close to each other without mutual interference of the folding-back rollers 23, 24 mounted on the mutually neighbored folding-back arms 21, respectively, while eliminating such a region which is not pressure-jointed by any of the rollers 23, 24 even in a state where the folding-back arms 21 are radially expanded, thereby strengthening the pressure-joint at the folded back portions.

It is noted that the rigid support members 10a are desirably to be displaced to be radially expanded synchronizedly with the radial expansion of the folding-back rollers 23, 24 in order that the side surfaces are constantly opposed to the folding-back rollers 23, 24 as they are radially expanded, correspondingly to the radial positions of the thus radially expanded folding-back rollers 23, 24 in folding back the carcass band side portions CBS by the folding-back rollers 23, 24, respectively, thereby further ensuring the pressure-jointing of the carcass band side portions CBS onto the carcass band center portion CBC.

Figure 10B:
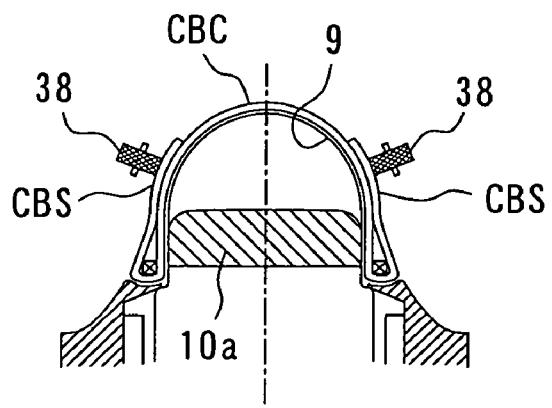
Figure 10C:
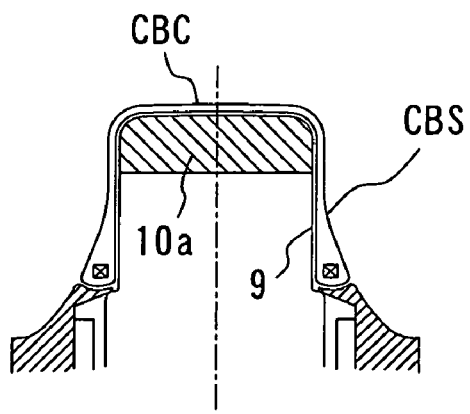

As shown in FIG. 10b after the folding-back rollers 23, 24 have been displaced to the radial inside as they were, portions of the carcass band side portions CBS near folded back ends thereof are pressure-jointed by stitching rollers 38 each having a surface subjected to a knurling treatment, while rotating the tire building drum 1. Subsequently, as shown in FIG. 10c, the rigid support members 10a are radially expanded more, and at this time, this radial expansion is conducted while reducing an internal pressure of the center bladder 9 to decrease a tension of the center bladder 9, thereby enabling the rigid support members 10a to be radially expanded smoothly. Meanwhile, tensions of carcass cords extending between the paired bead lock means 7 also act as factors which obstruct a smooth radial expansion of the rigid support members 10a, i.e., of the core body 10. Although resistances increased in this way against the radial expansion of the core body 10 lead to increased loads of a motor for driving the sleeve reciprocative driving means for displacing the sleeves carrying thereon the core body 10 toward and away from each other, the radial expansion of the core body can be made smooth, by setting a process for varying an internal pressure of the center bladder 9 or varying a spacing between the pair of bead locks correspondingly to an outer diameter of the core body, or by controlling at least one of the internal pressure of the center bladder 9 and the spacing between the pair of bead locks based on a load value of the motor in a real-time manner, while utilizing the fact of the increased load and in a manner that the load value does not exceed a predetermined magnitude.

Figure 11A:
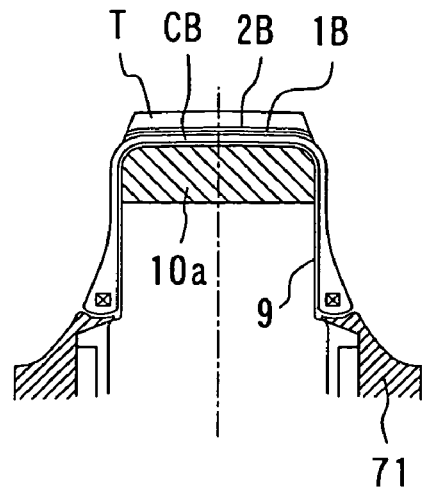
FIG. 11 is a cross-sectional view of the tire in course of molding, illustrating still another molding step subsequent to FIG. 10.
Figure 11B:
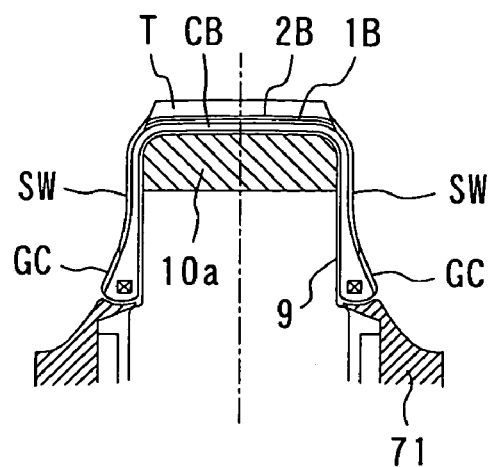
Figure 11C:
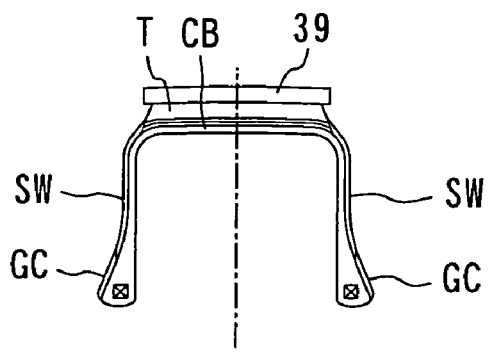

Thereafter, as shown in FIG. 11a, two or more layers of belt members 1B, 2B are assembled in this order onto an outer periphery of the carcass band center portion CBC along the outer peripheral surfaces of the rigid support members 10a, then belt reinforcing members (not shown) such as spiral layers are assembled as required, and then a tread rubber T is assembled onto an outer periphery thereof. Next, as shown in FIG. 11b, sidewall rubbers SW and rubber chafer members GC are assembled onto side surfaces of the carcass band CB having the folded back side portions, respectively, to thereby complete a green tire, and thereafter, as shown in FIG. 11c, an outer periphery of the green tire is gripped by an outside grip ring 39 to detach the green tire from the tire building drum 1.

It is possible here to arrange such a rubber at a portion of the sidewall rubbers SW, which is white in color different from that of the surrounding.

There will be explained a second embodiment according to the present invention based on FIG. 12. While FIG. 12 is a cross-sectional view schematically showing substantially half of a tire building drum 1A of this embodiment, the tire building drum 1A of this embodiment is a modification of the tire building drum 1 of the first embodiment and is different therefrom only in that structures of the sleeve 3 and slider 4 are partially different from those in the first embodiment and the configuration for reciprocally driving them is different, while the core body 10 mounted on the sleeves 3, and the bead lock means 7, folding-back means 8 and center bladder 9 mounted on the sliders 4 are fully the same as those in the first embodiment, so that reference numerals in FIG. 12 corresponding to them are made the same and detailed description thereof is omitted for simplicity. Further, the tire building method for molding a tire by utilizing these means are also the same as those in the first embodiment, so that explanation of the former is also omitted.

It is noted that FIG. 12a shows a state where the core body 10 is radially expanded and the bead lock means 7 are displaced close to each other, and FIG. 12b shows a state where the core body 10 is radially contracted and the bead lock means 7 are displaced away from each other.

Firstly, in radially expanding a pair of core bodies 10, sleeves 3A are displaced close to each other by reciprocative driving means for the sleeves 3A to displace end portions of a pair of links 11a coupled to the sleeves 3A close to each other, respectively, and the sleeve reciprocative driving means for displacing the sleeves 3A are adapted with: female screw members 41A coupled to the sleeves 3A at radial insides thereof through coupling members 42A, respectively; a screw shaft 50A disposed in a hollow of the center shaft 2 and having right and left male screw portions 51A threadedly engaged with the associated female screw members 41A, respectively; and screw shaft rotating means (not shown) for rotating the screw shaft 50A; in which the right and left male screw portions 51A of the screw shaft 50A have mutually opposite lead orientations, respectively. Based on this configuration, the screw shaft 50A is rotated by the screw shaft rotating means to displace the female screw members 41A toward and away from each other in a left-right symmetric manner, thereby allowing the pair of core bodies 10 installed on the sleeves 3A to be precisely expanded or contracted. It is noted that the center shaft 2 is formed with an elongated through-hole 2b for allowing the coupling members 42A to penetrate therethrough.

Next, bead lock reciprocative driving means for displacing the paired bead lock means 7 close to each other may be adapted with: screw portions 12A formed at end portions of sliders 4A having the bead lock means 7 mounted thereon, respectively, so as to have mutually opposite screw thread extending directions for the right and left sliders 4A, respectively; associated screw blocks 13A threadedly engaged with the screw portions, respectively; and rotating means (not shown) for rotating the sliders 4A and the screw blocks 13A relative to each other. Further, provided at end portions of the center shaft 2 are stoppers 14A for restricting axial displacements of the screw portions 12A of sliders 4A, respectively.

Although the screw portions 12A and screw blocks 13A in FIG. 12 are adapted with male screws and female screws, respectively, reverse combinations are possible.

Here, the means for rotating the screw portions 12A and screw blocks 13A relative to each other, and means for restricting rotations of the screw portions 12A relative to the center shaft 2 so as to keep axial positions of the paired sliders 4A constant to thereby fix the axial positions of the bead lock means, have been explained in the first embodiment, so that detailed description thereof is omitted.

Figure 13:
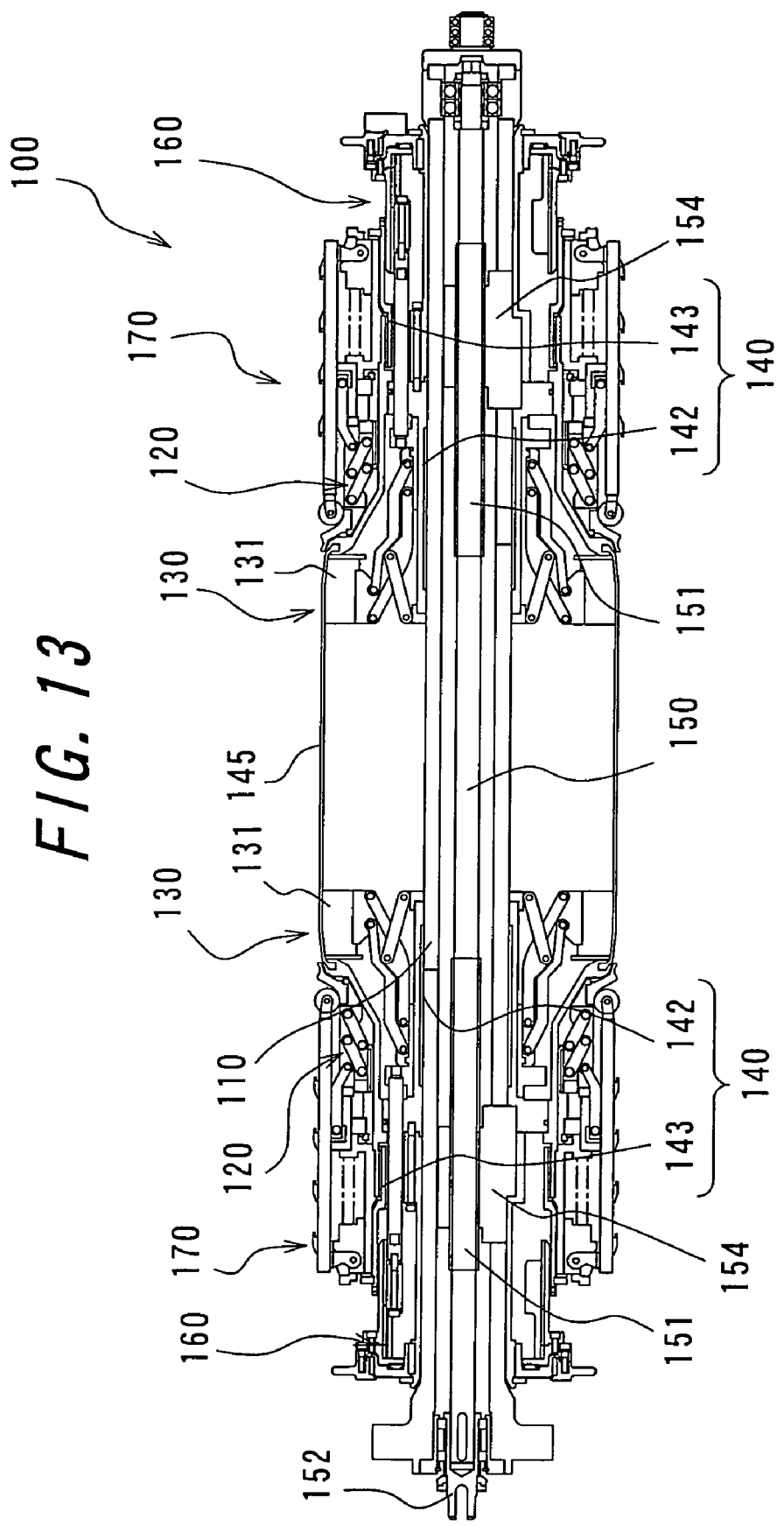
FIG. 13 is a cross-sectional view of a tire building drum according to a third embodiment of the present invention.

There will be explained a third embodiment according to the present invention based on FIGS. 13 through 21. FIG. 13 is a cross-sectional view of a tire building drum 100 of this embodiment.

This tire building drum 100 comprises: a hollow center shaft 110; a pair of bead lock means 120 for locking both bead cores; a pair of core bodies 130 for supporting a carcass band from a radial inside, and adapted to be axially displaced toward and away from each other and adapted to be deformed and thereby expanded or contracted; core-body expanding/contracting means 160 for expanding or contracting the core bodies 130; and a pair of folding-back means 170 for folding back carcass band side portions around associated bead cores, respectively; in which the drum is provided with a pair of sliders 140 to be displaced toward and away from each other on the center shaft 110, and each slider 140 has mounted thereon the bead lock means 120, core body 130 and folding-back means 170 positioned at the axially same side as the slider 140.

Disposed in a hollow of the center shaft 110 is a screw shaft 150 constituting a part of slider reciprocative driving means for displacing the pair of sliders 140, and the core bodies 130 each comprise a plurality of rigid support members 131 toroidally arranged and displaced and thereby expanded or contracted.

Figure 18:
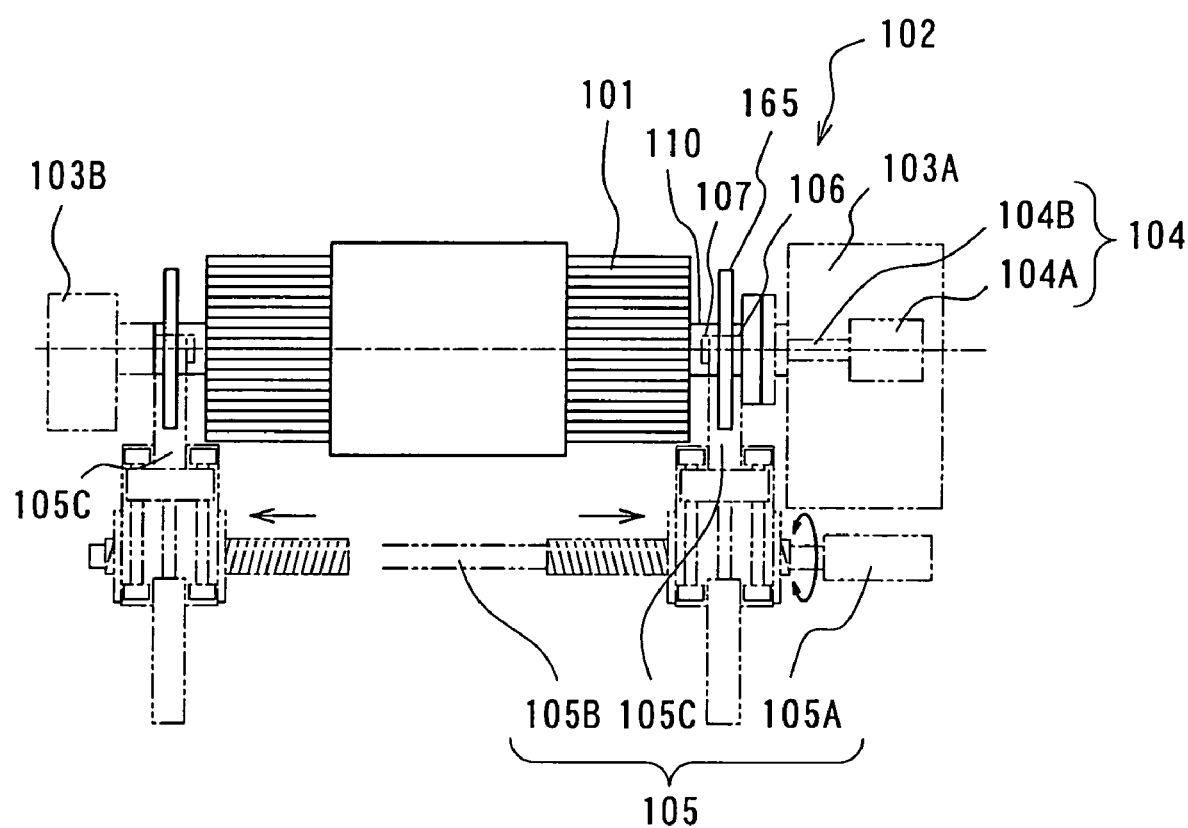
FIG. 18 is a diagrammatic arrangement view illustrating interconnection between the tire building drum and a molding machine.

There will be now explained interconnection between the tire building drum 100 and a tire building machine 102 for supporting and driving it, with reference to a diagrammatic arrangement view of the tire building machine shown in FIG. 18. The tire building machine 102 comprises: a molding machine body part 103A having the center shaft 110 of the tire building drum 100 mounted thereon, and for rotationally driving the center shaft 110; and an opposite driving end supporting part 103B for supporting an end of the center shaft 110 opposite to its driving end. The tire building machine 102 further comprises: a slider driving part 104 comprising an external shaft 104B coupled to the screw shaft 150 of the tire building drum 100, and a rotation servomotor 104A for rotating the screw shaft 150 through the external shaft 104B; and a reciprocative driving part 105 comprising a right/left screw 105B, and a pair of driving arms 105C threadedly engaged with the right/left screw 105B so as to be moved equidistantly in a right-and-left direction. The driving arms 105C of this reciprocative driving part 105 are constitutionally adapted to be displaced close to and away from an axis of the tire building drum 100, and these driving arms are each provided with, at tip ends thereof: a clamper 106 to be engaged with an external drive coupling part 165 of the core-body expanding/contracting means 160; and folding-back pawls 107 to be abutted on the associated folding-back mechanism 170 to thereby operate the same.

There will be explained respective main parts constituting the tire building drum 100. As shown in FIG. 13, each slider 140 is adapted with: a slider guide part 142 to be axially slid on the center shaft 110; and a bead lock means supporting part 143 fixedly mounted on the slider guide part 142 and extending to a radial outside from the slider guide part 142.

The slider reciprocative driving means for displacing the sliders 140 are adapted with: female screw members 154 coupled to the slider guide parts 142 of the sliders 140 at radial insides of the slider guide parts, respectively; the screw shaft 150 threadedly engaged with the female screw members; and screw shaft rotating means (not shown) for rotating the screw shaft; and the screw shaft 150 is provided with a pair of right and left male screw portions 151 having mutually opposite leads, and a slider drive coupling portion 152 for coupling the screw shaft 150 to the external shaft 104B.

Based on this configuration, the screw shaft 150 is rotated from the exterior through the slider drive coupling portion 152, to thereby move the female screw members 154 threadedly engaged with the male screw portions 151 by equal distances in axially opposite directions, respectively, thereby allowing the respective sliders 140 to be displaced toward and away from each other.

The respective sliders 140 are precisely moved in axially mutually opposite directions by equal distances, respectively, by rotation of the screw shaft 150 as described above, thereby enabling precise achievement of so-called widthwise approach where the bead lock means 120 and core bodies 130 are caused to approach an axial center synchronizedly with radial expansion of the core bodies 130 in bulging a carcass band center portion while maintaining path lengths of cords extending between bead cores. Further, the sliders 140 are driven by the exterior servomotor 104A through the screw shaft 150 such that the sliders can be stopped at arbitrary axial positions, so that such tires having different lengths of carcass cords extending between bead cores, and/or having different widths of belt members, can be continuously molded without exchanging the above described members of the drum 100.

Provided between the right and left sliders 140 is an center bladder 145 deformable for expansion or contraction to hermetically seal a space delimited by the sliders 140, and the center bladder 145 has both axial side portions mounted to axially center-side ends of the bead lock means supporting parts 143 of the sliders 140, respectively. This center bladder 145 is adapted to cover, in a tensioned state, those gaps between rigid support members 131 constituting the core bodies 130 at an outer peripheral surface to be formed when the members 131 are radially expanded, thereby allowing a carcass member body portion to be more uniformly supported, and thereby allowing configuration of a uniform bonding surface upon bonding a belt member onto the center bladder 145, thereby enabling contribution to improved uniformity.

Figure 14:
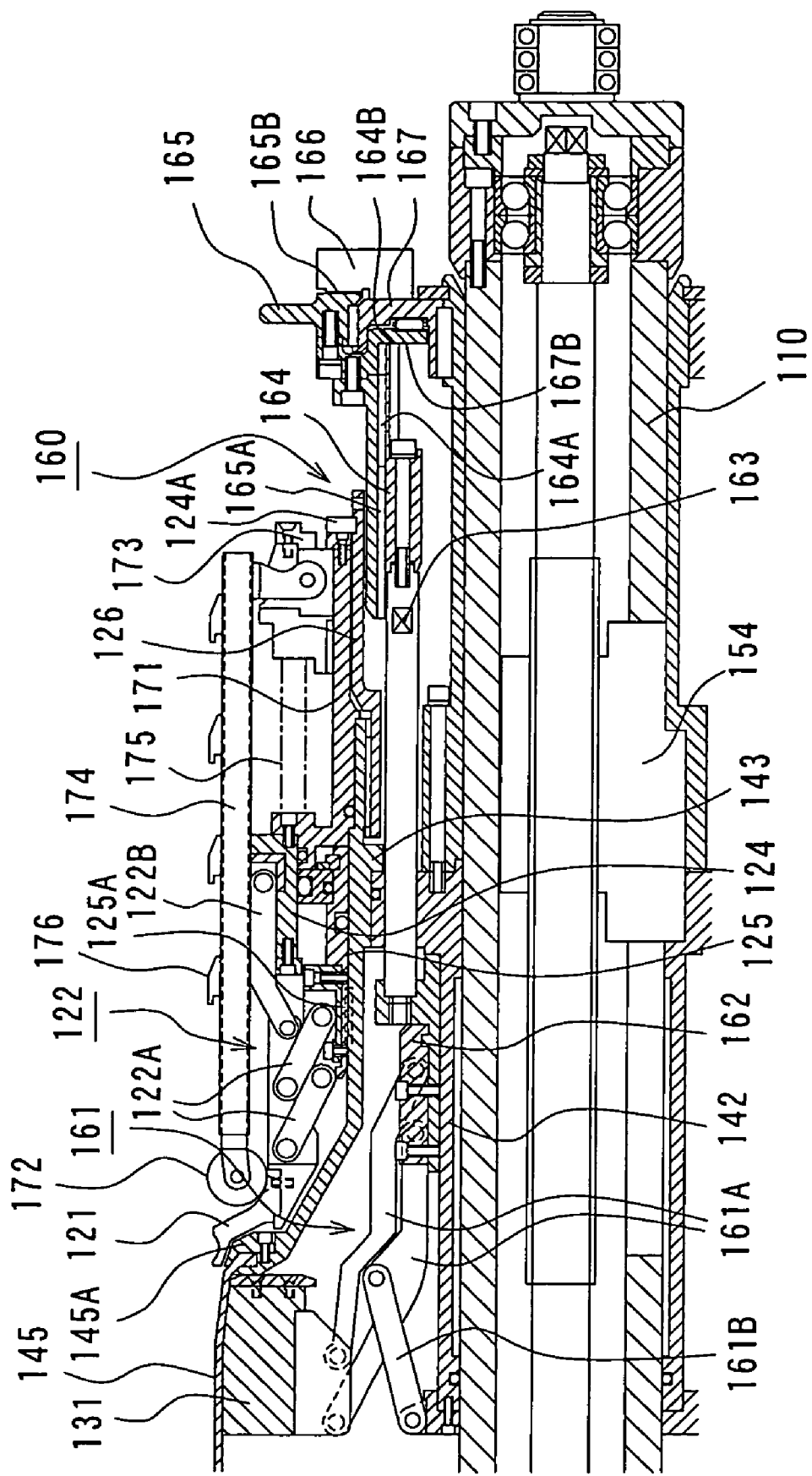
FIG. 14 is a detailed partial cross-sectional view of the tire building drum of the third embodiment.
Figure 15:
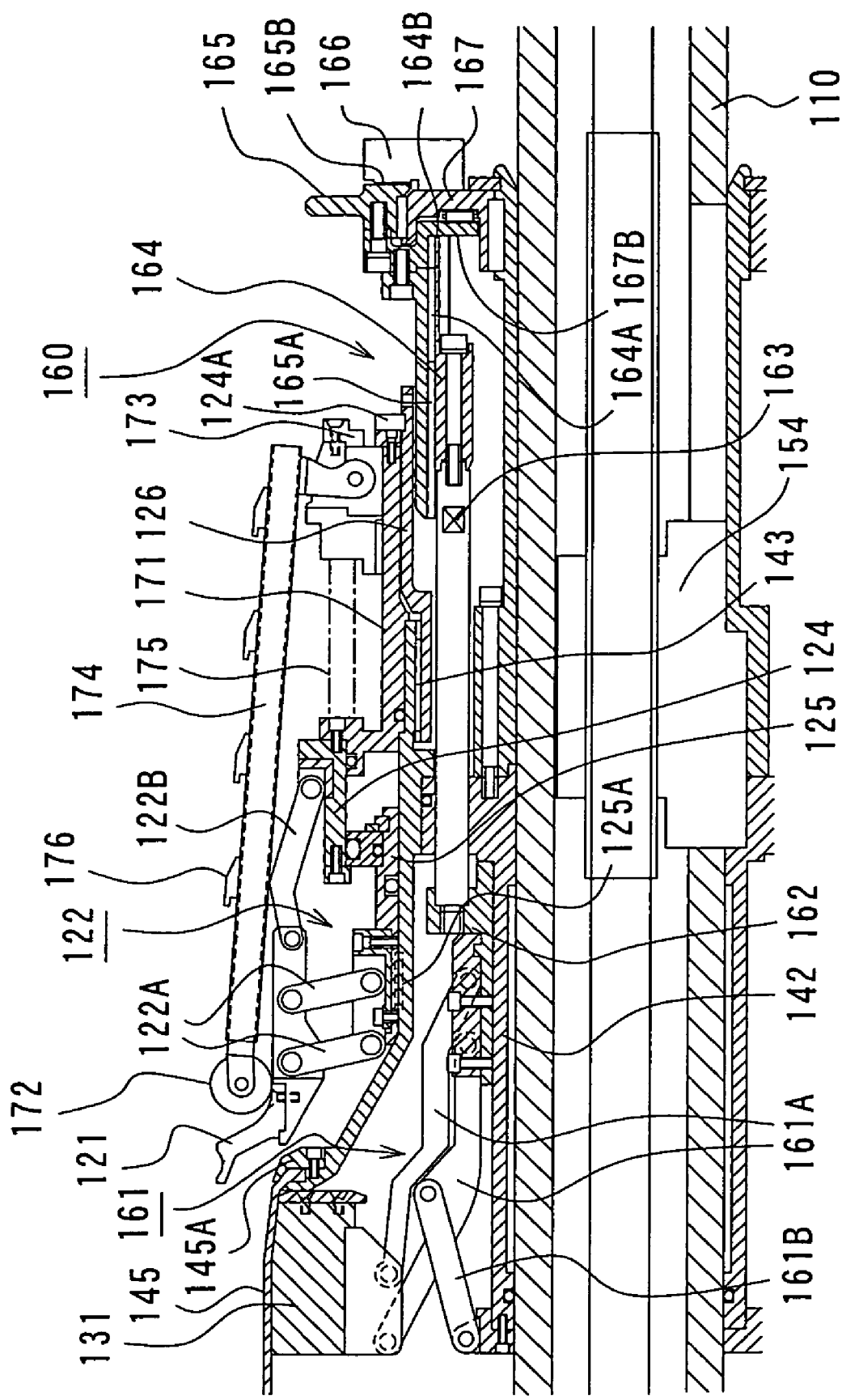
FIG. 15 is another detailed partial cross-sectional view of the tire building drum of the third embodiment.
Figure 16:
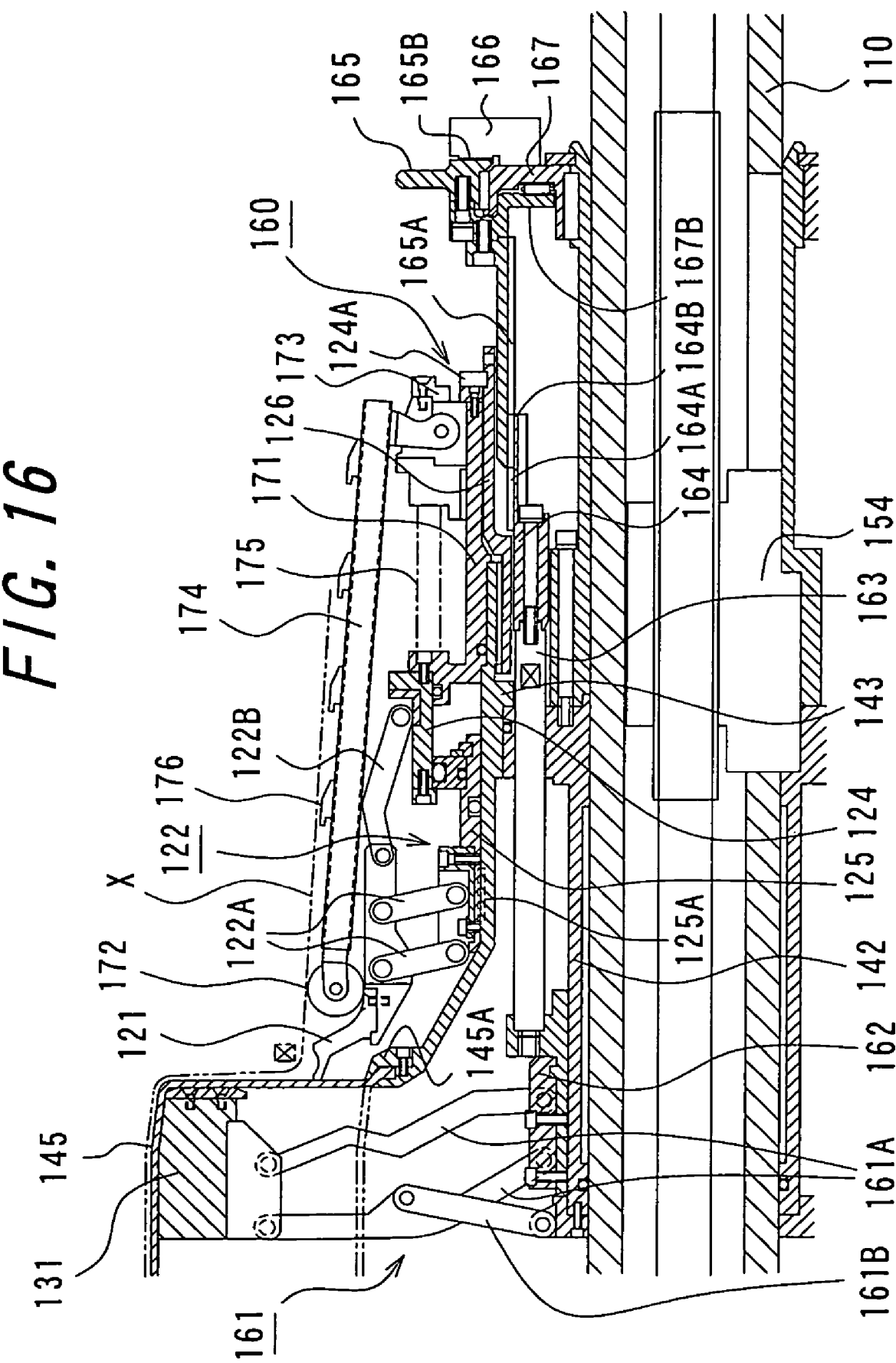
FIG. 16 is a further detailed partial cross-sectional view of the tire building drum of the third embodiment.
Figure 17:
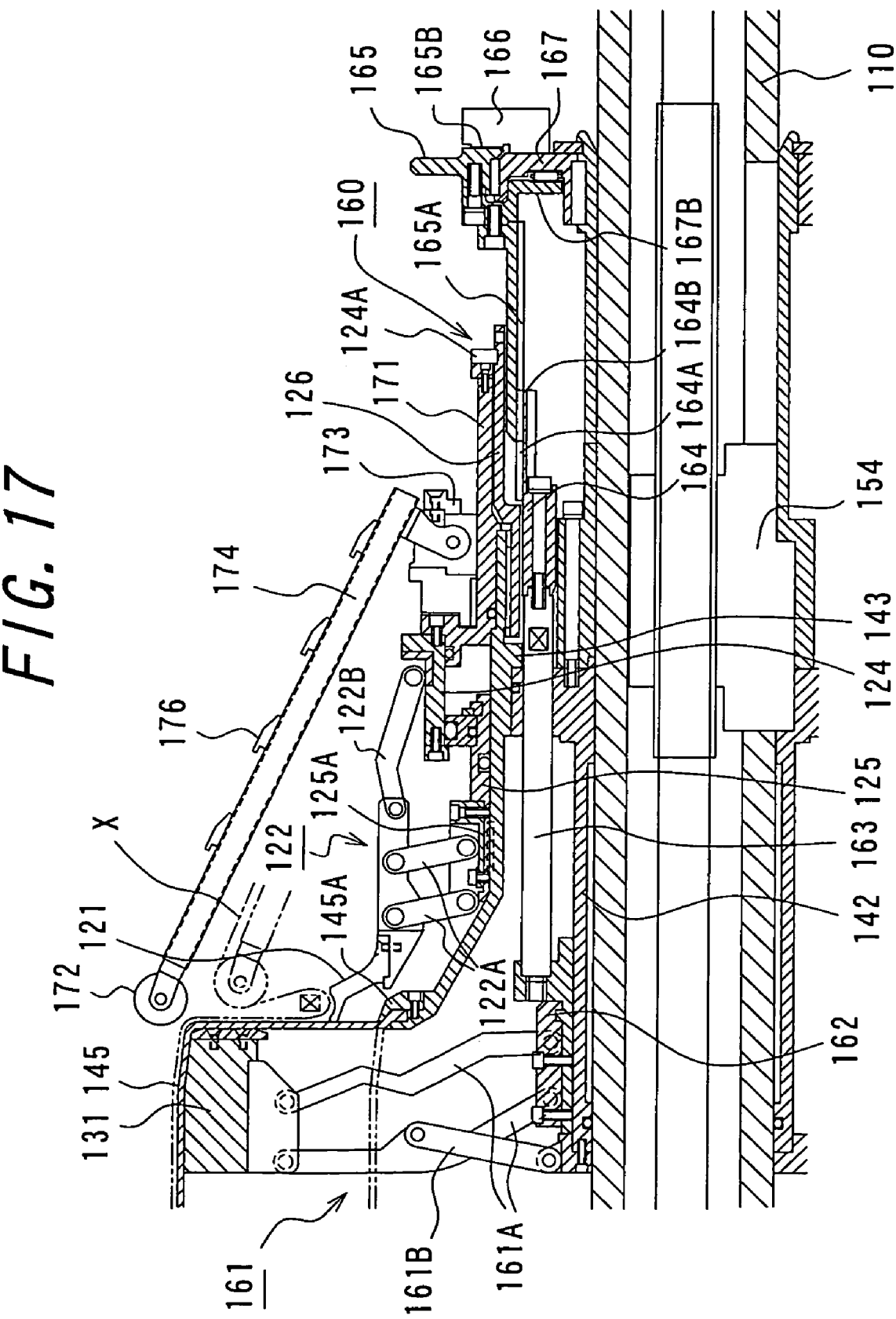
FIG. 17 is a still another detailed partial cross-sectional view of the tire building drum of the third embodiment.

FIG. 14 through FIG. 17 are partially cut-away detailed partial views of the sliders 140, core-body radially expanding means 160, bead lock means 120, and folding-back means 170 in different states of the tire building drum, respectively, and the respective members will be explained in detail based on these figures. Here, although only FIG. 14 shows a state where the sliders 140 are located at axially outer positions, respectively, all FIG. 15 through FIG. 17 show states where the sliders 140 have been displaced to an axial center side, respectively.

As shown in FIG. 14, the right and left core-body radially expanding means 160 for displacing the rigid support members 131 to expand or contract them, each comprise: expanding/contracting link parts 161 annularly arranged to be coupled to the associated rigid support members 131 to thereby expand or contract them, respectively; a link uniting part 162 for uniting these expanding/contracting link parts 161 and axially slid on the associated slider guide part 142; a longitudinal movement screw member 164 coupled to the link uniting part 162 through a coupling rod 163, and adapted to be axially displaceable while rotation of the longitudinal movement screw member 164 around the center shaft 110 being restrained; a screw block 165 threadedly engaged with the longitudinal movement screw member 164 through trapezoidal threads, and adapted to be axially fixed and circumferentially rotatable; and a brake 166 functioning as relative rotation restricting means for restricting a rotation of the screw block 165 relative to the center shaft.

Each expanding/contracting link part 161 is adapted with: a pair of parallel links 161A each having opposite ends hinged to a pin mounted on the associated link uniting part 162 and to a pin coupled to the associated rigid support member 131, respectively, so that the parallel links are swung parallelizedly; and a swing link 161B having opposite ends hinged to a pin mounted on one of the parallel links 161A and to a pin fixedly provided at the link uniting part 162.

Each screw block 165 is born by a support ring 167 fixed concentrically with the center shaft 110. When the center shaft 110 is rotated after the brake 166 is released in a state shown in FIG. 15 and each driving arm 105C of the tire building machine 102 is brought close to a tire building drum axis such that the screw block 165 is clamped and fixed by the clamper 106 provided at the tip end of the associated driving arms 105C, the longitudinal movement screw member 164, coupling rod 163, and link uniting part 162 are integrally moved to an axial inside into a state shown in FIG. 16 because the longitudinal movement screw member 164 is coupled to the associated coupling rod 163 the rotation of which relative to the center shaft 110 is restrained by the associated slider guide part 142. In actually bulging a carcass band center portion, the rigid support members 131 are radially expanded while being moved to an axial center, so that each link uniting part 162 is moved to an axial center side by a displacement larger than a displacement of the associated slider guide part 142 of the associated slider 140 to be moved to the axial center. Namely, each link uniting part 162 is moved to the axial center relative to the associated slider guide part 142, so that the swing link 161B and the pair of parallel links 161A both hinged to the associated link uniting part 162 cooperate with each other, thereby allowing the rigid support members 131 to be radially expanded while maintaining postures thereof, respectively.

There will be now additionally explained the brakes 166 functioning as the means for restricting rotations of the screw blocks 165 relative to the center shaft 110. Each screw block 165 has a female screw portion 165A threadedly engaged with a male screw portion 164A of the associated longitudinal movement screw member 164 through trapezoidal threads, thereby allowing, by virtue of an effect of this threaded engagement, counteraction against a contracting force of the center bladder 145 and against a force radially contracting segments upon bonding a belt member with tension onto an outer periphery of the center bladder 145. Nonetheless, to avoid dislocation of each screw block 165 due to vibration, impact or the like, the brake 166 is mounted on the associated support ring 167 and a brake disk (not shown) is protruded to abut on a brake working face 165B of the screw block 165, thereby enabling the screw block 165 to be assuredly fixed relative to the center shaft 110.

In radially contracting the rigid support members 131, there is conducted an operation reverse to the radial expansion, i.e., the center shaft 110 of the tire building drum is rotated reversely to that of radial expansion of the rigid support members 131 while clamping each screw block 165 by the associated clamper 106, so that the associated longitudinal movement screw member 164, coupling rod 163 and link uniting part 162 are integrally moved to the axial outside, thereby allowing the rigid support members 131 to be radially contracted. Further, each support ring 167 is provided with an axial inside surface 167A to be abutted on an axial outer end surface 164B of the associated longitudinal movement screw member 164, and these surfaces are abutted on each other so that radial positions of the rigid support members 131 are kept constant when the rigid support members 131 are radially contracted to the minimum. In starting the radial contraction of the radial contracting operation, it is important to weaken a radially contracting force of the center bladder 145 by increasing an internal pressure of the center bladder 145, so as to release a self-locked state of the longitudinal movement screw member 164 and the associated screw block 165 which are tightly and threadedly engaged with each other through the trapezoidal threads. Further, to cause the axial outer end surface 164B of the longitudinal movement screw member 164 to be abutted on the axial inside surface 167A of the associated support ring 167 without impact, it is also important that the clamping force of the associated clamper 106 is lowered just before this abutment, so that the clamper 106 and screw block 165 are slid with each other when the axial inside surface 167A abuts on the associated longitudinal movement screw member 164.

There will be now explained the bead lock means 120. Although it is also possible in this embodiment to employ the same one as the bead lock means 7 in the building drums 1, 1A in the above described first and second embodiments, there will be described in this embodiment another example having a configuration slightly different from the above. Each bead lock means 120 comprises: bead lock segments 121 which are circumferentially arranged adjacent to each other so to be expanded or contracted in an annular shape; bead lock expanding/contracting link parts 122 coupled to the associated bead lock segments 121, respectively; bead lock pistons 125 coupled to these link parts 22, respectively, and axially movable; bead lock cylinders 124 for axially moving these bead lock pistons 125, respectively; and a bead lock cylinder driving ring 126 engaged with the associated bead lock cylinders 124 and threadedly engaged with the associated bead lock means supporting part 143 of the slider 140.

Each bead lock expanding/contracting link part 122 is adapted with: a pair of parallel links 122A each having opposite ends hinged to the associated bead lock segment 121 and associated bead lock piston 125, respectively; and a swing link 122B having opposite ends hinged to the associated bead lock segment 121 and associated bead lock cylinder 124, respectively.

As the bead lock cylinders 24 are pressurized at interior thereof in a state shown in FIG. 14 to thereby move the bead lock pistons 125 to the axial center, the bead lock segments 121 can be radially expanded as shown in FIG. 15 while maintaining postures thereof by virtue of functions of the parallel-links 122A and swing links 122B. Further, as the bead lock cylinders 124 are brought to negative pressures at the interior thereof, the bead lock pistons 125 are moved to an axial outside, thereby enabling the bead lock segments 121 to be radially contracted through the bead lock expanding/contracting link parts 22.

As each bead lock cylinder driving ring 126 threadedly engaged with the associated bead lock means supporting parts 143 is rotated around the center shaft from the state shown in FIG. 14, the bead lock cylinder driving ring 126 is displaced to the axial outside while being rotated and the associated bead lock cylinders 124 provided with engagement pins 124A to be engaged with the bead lock cylinder driving ring 126 are also displaced to the axial outside without rotation because the associated bead lock pistons 125 are restrained in rotation around the center shaft by rotation lock keys 125A, respectively. As a result, the associated bead lock segments 121 can also be displaced to the axial outside to thereby ensure a clearance at the axial outside of the center bladder 145 for detaching an associated bladder ring 145A for latching an associated edge portion of the center bladder 145, thereby resultingly facilitating an exchanging operation of the center bladder 145. These screw portions provided at the bead lock means supporting parts 143, the bead lock cylinder driving rings 126 threadedly engaged therewith, and the rotation lock keys 125A cooperatively establish means for varying an axial position of that bead lock means 120 relative to an axial side portion of the center bladder 145, which is located at the same axial side as this axial side portion.

There will be now explained the pair of right and left folding-back mechanisms 170. Although it is also desirable in this embodiment to utilize the same one as the folding-back means 8 in the building drums 1, 1A in the above described first and second embodiments, there will be described in this embodiment another example having a configuration slightly different from the above.

The right and left folding-back means 170 each comprises: a base part 171 fixedly coupled to the bead lock means supporting part 143 of the associated slider 140; folding-back rollers 172 which are circumferentially arranged adjacent to each other so to be expanded or contracted in an annular shape; a roller exterior drive abutment part 173 to be abutted on the associated folding-back pawls 107 which are provided at the tip end of the driving arm 105C of the tire building machine 102 and which is reciprocally displaced axially, so that the roller exterior drive abutment part 173 is slid and reciprocally displaced on the associated base part 171; folding-back arms 174 each having one end coupled to the associated folding-back roller 172 and the other end hinged to the associated roller exterior drive abutment part 173; a return spring 175 having opposite ends secured to the associated base part 171 and roller exterior drive abutment part 173, respectively; and a plurality of rubber bands 176 fixedly provided around outer peripheries of the associated folding-back arms 74. It is noted that the folding-back pawls 107 are provided by at least two in number at a symmetric arrangement with respect to a drum rotational axis, so as to apply forces parallel to the axis to the associated roller exterior drive abutment part 173 to thereby axially move the same.

In FIG. 16, provided on an outer peripheral surface formed by annularly arranged folding-back arms 174 is an associated fold-back portion X comprising a side portion of a carcass band or comprising a sidewall rubber in addition thereto, and this fold-back portion X is folded back by radially expanding the folding-back arms 174 and the associated folding-back rollers 172 coupled thereto, respectively. Namely, when each driving arm 105C is brought close to the axis of the tire building drum 100 and the driving arm 105C is moved to the axial center to thereby cause the associated folding-back pawls 107 to abut on the associated roller exterior drive abutment part 173 to thereby further move it to the axial center side, the roller exterior drive abutment part 173 is moved to the axial center along the associated base part 171 as shown in FIG. 17 so that the associated folding-back arms 174 hinged to the roller exterior drive abutment part 173 as well as the folding-back rollers 172 are also moved to the axial center. However, the folding-back rollers 172 are restricted in movement to the axial center side by the radially expanded center bladder 145, with the fold-back portion X interposed therebetween. Thus, the folding-back arms 174 and folding-back rollers 172 are radially expanded around hinged points between them and the roller exterior drive abutment part 173, thereby allowing the fold-back portion X to be folded back.

To radially contract the folding-back rollers 172 and folding-back arms 174 after radially expanding them and folding back the associated fold-back portion X, the associated roller exterior drive abutment part 173 is moved to the axial outside by a function of the associated return spring 175, and the folding-back arms 174 are radially contracted by functions of the associated rubber bands 176.

Figure 19:
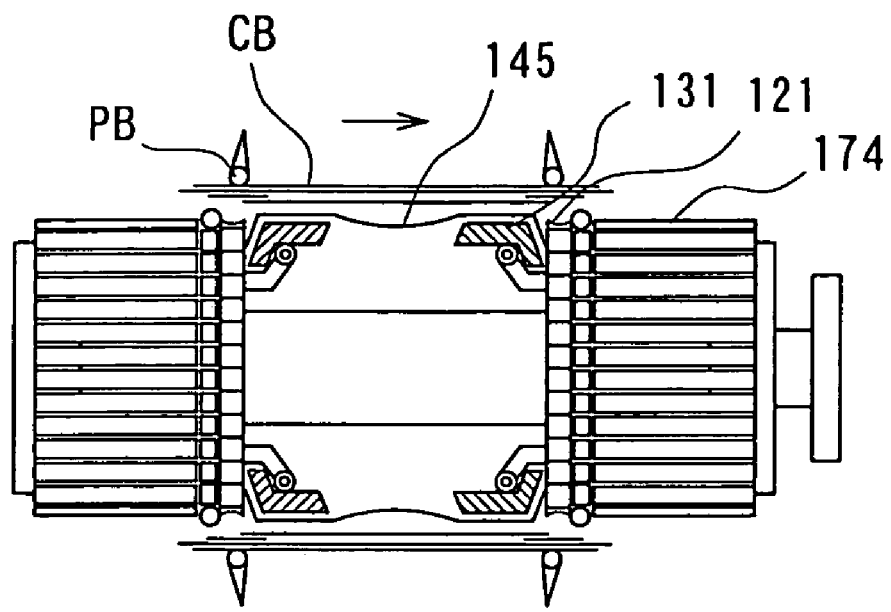
FIG. 19 is a partially cut-away diagrammatic view of the building drum of the third embodiment illustrating a molding procedure thereof.
Figure 20:
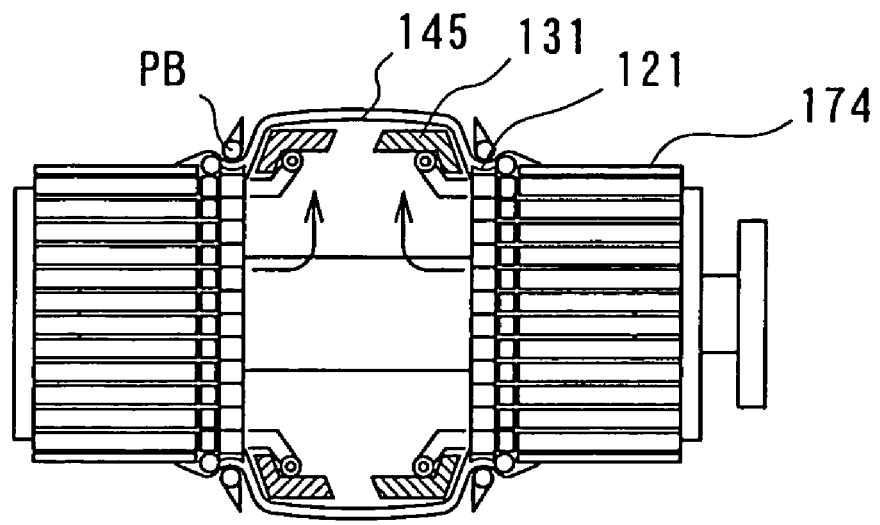
FIG. 20 is a partially cut-away diagrammatic view of the building drum of the third embodiment illustrating another molding procedure thereof subsequent to FIG. 19.
Figure 21:
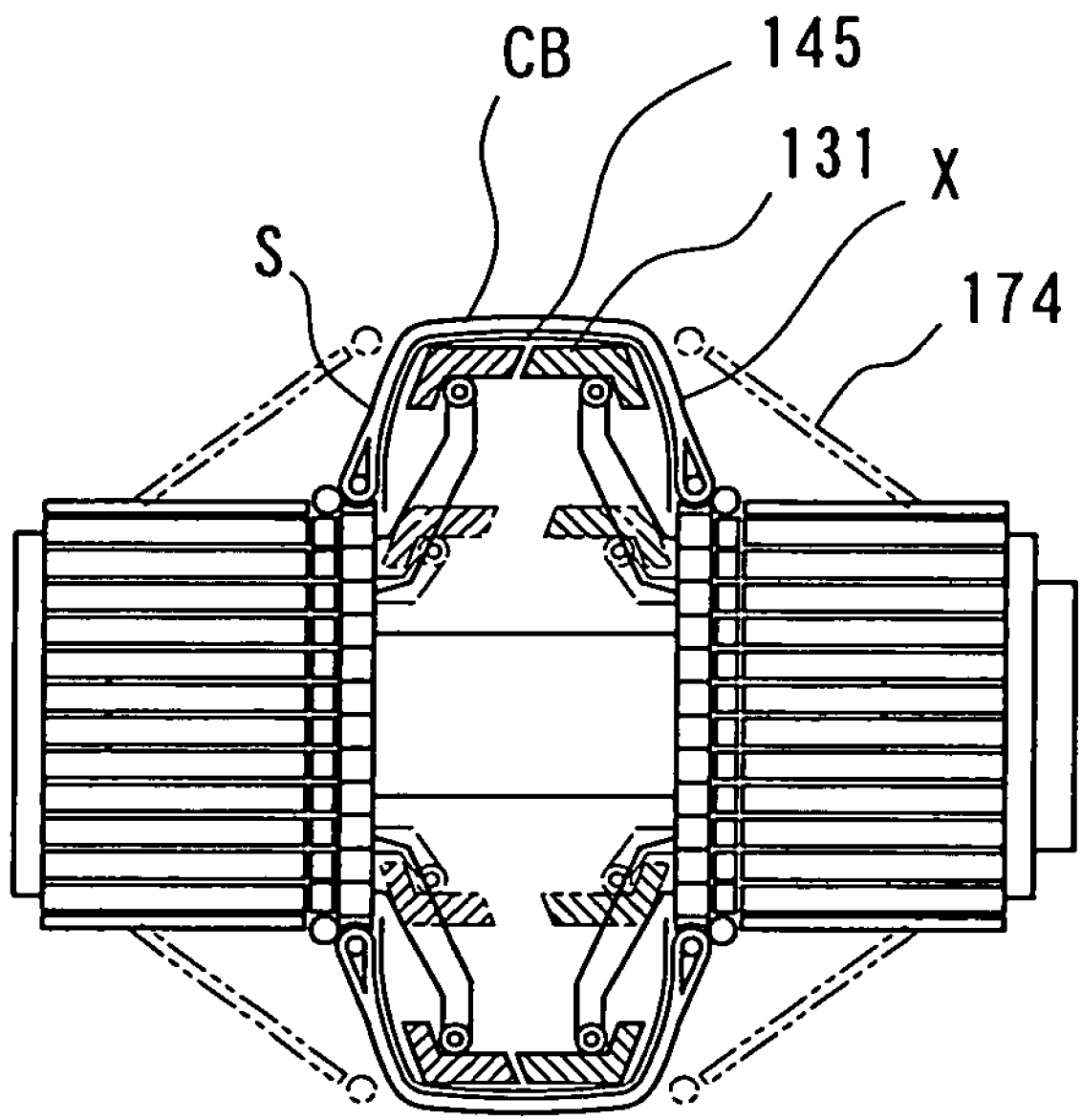
FIG. 21 is a partially cut-away diagrammatic view of the building drum of the third embodiment illustrating a further molding procedure thereof subsequent to FIG. 20.

There will be now explained an example of procedure for molding a green tire by using the tire building drum 100 based on partially cut-away front views shown in FIG. 19 through FIG. 21, respectively. As shown in FIG. 19, in a state of this tire building drum 100 where the rigid support members 131, bead lock segments 121, and folding-back arms 174 are radially contracted, arranged at a radial outside of this drum 1 is a carcass band CB having previously assembled thereon preset beads PB molded by another drum. At this time, the spacing between the bead lock segments 121 of both the bead lock means 120 is set correspondingly to a spacing between both bead cores B of the carcass band CB which has been set correspondingly to each tire size.

Subsequently, as shown in FIG. 20, the bead lock segments 121 are radially expanded to retain the preset beads PB, and thereafter the rigid support members 131 and the center bladder 145 are radially expanded while narrowing an axial spacing between the bead lock means 120. At this time, there is adjusted an internal pressure of the center bladder 145 correspondingly to a diameter of the center bladder 145, so as to prevent an unnecessary radially contracting force from acting on the rigid support members 131 and so as to cause a uniform tension to act on the center bladder 145.

Next, as shown in FIG. 21, the rigid support members 131 and the center bladder 145 are radially expanded to predetermined maximum diameters, respectively, correspondingly to a tire size, and thereafter the folding-back arms 174 are radially expanded while moving them toward the axial center side, thereby folding back the fold-back portions X. Then, bonded onto an outer periphery of the radially expanded carcass band CB are a belt member and a tread rubber, thereafter ribbon-like sidewall rubbers are wrapped onto tire side portions to thereby form sidewall rubbers having predetermined cross-sectional shapes, respectively, and then stitching operations are applied to the sidewall rubbers, thereby completing a green tire. Thereafter, the folding-back arms 174, center bladder 145, rigid support members 131, and bead lock segments 121 are radially contracted, and the green tire is taken out.

Here, in case that sidewall rubbers interfere with the bead lock segments 121 upon wrapping the sidewall rubbers while keeping bead lock in forming the sidewall rubbers, it is even possible to radially contract the bead lock segments 121 in advance of wrapping of the sidewall rubbers at the interfering portion, and to increase an internal pressure of the center bladder 145 to thereby retain the green tire in course of molding from inside thereof without bead lock.

While the first through third embodiments have been described, the screw shafts 50, 50A, 150 have been provided in the hollow of the center shafts 2, 110, respectively, in any of the embodiments. Although rotational angles of these screw shafts from origins are varied in a one-to-one corresponding manner with respect to screw shaft rotation angle information held in a molding machine side while the building drum is mounted on the molding machine, the screw shafts are very likely to be rotated by external forces such as due to vibration, impact or the like which act during handling when the building drums 1, 1A, 100 are brought into states detached from the molding machine for exchange or repair. Thus, at the time of mounting each screw shaft to the molding machine again, it is required that the screw shaft is restored into its original state or the screw shaft rotation angle information held at the molding machine side is required to be set again correspondingly to a rotation angle at the time when the screw shaft is mounted again, thereby requiring a so-called originating operation. This operation requires extensive time and steps, and to deal with this problem, there is provided screw shaft origin posture holding means.

This screw shaft origin posture holding means will be explained by taking the third embodiment for example, with reference to FIG. 22 showing a partial cross-section of the center shaft 110. Formed through a center shaft flange 111 of the center shaft 110 acting as a fastening portion to a molding machine side, is a through-hole 111B in radial direction, and a lock pin 112 is fitted through this through-hole 111B. Provided in the through-hole 111B and radially outside the lock pin 112, is urging means 116 for urging the lock pin 112 to a radial inside, and an end of this urging means 116 opposite to the lock pin 112 is fixed to the center shaft flange 111. The lock pin 112 has a radial inside end formed into a conical projection 112A which is adapted to be engaged with a concave 155 formed on a peripheral surface of the screw shaft 150 in a state where the lock pin 112 is displaced to the radial inside to thereby restrict rotation of the screw shaft 150.

Further, formed on the peripheral surface of the lock pin 112 at a drum mounting flange surface 111A side, is a cavity 113, and this cavity 113 has arranged therein a plurality of needle bearings 117 each oriented in a circumferential direction such that a plane circumscribed by these needle bearings 117 defines a tapered surface 113A tapered with respect to a radial direction.

Furthermore, there is formed an axial hole 111C penetrating between the through-hole 111B of the center shaft flange 111 and the drum mounting flange surface 111A; provided in the axial hole 111C is a wedge member 114 to be displaced along this axial hole; mounted on an end at the drum mounting flange surface 111A side of the wedge member 114, is a pin 115; and an end surface of the through-hole 111B side defines an inclined surface 114A to be engaged with the tapered surface 113A. Then, the lock pin 112, the concave 155 of screw shaft 150, the urging means 116, and the wedge member 114 cooperatively establish the screw shaft origin posture holding means.

In a state where the tire building drum 100 having such screw shaft origin posture holding means is mounted on a molding machine, the pin 115 is pushed by a flange at the molding machine side so that the wedge member 114 is pushed into the through-hole 111B side, and this pushing force acts to displace the lock pin 112 to the radial outside through the needle bearings 117 arranged in the tapered surface 113A and engaged with the inclined surface 114A of the wedge member 114, thereby resultingly allowing the screw shaft 150 to be rotated without being locked by the lock pin 112.

Here, zero return is to be conducted by returning a rotation angle of the screw shaft 150 to its origin when the drum 100 is detached from the molding machine, and at this time, there is settled a position of the origin such that the concave 155 of the screw shaft 150 is directed toward the projection 112A of the lock pin 112. When the building drum 100 in this state is detached from the molding machine, there is released the force which has acted through the pin 115 and wedge member 114 and which is in a direction for displacing the lock pin 112 to the radial outside, so that the projection 112A of the lock pin 112 is allowed to be engaged with the concave 155 of the screw shaft 150 by virtue of function of the urging means 116, and in this way, the screw shaft 150 can be fixedly held so as not to rotate relative to the center shaft 110 even in a state where the building drum 100 is detached from a molding machine. By virtue of this screw shaft origin posture holding means, it is possible to automatically restrain and release rotation of the screw shaft 150 by simply attaching and detaching the building drum 100 to and from a molding machine, thereby enabling the drum 100 to be automatically exchanged.

INDUSTRIAL APPLICABILITY

It will be appreciated form the foregoing description that, according to the present invention, upon assembling tire component members such as a belt member, tread rubber, sidewall rubbers and the like onto an outside of a bulged carcass band center portion, these component members are directly assembled on a building drum having previously arranged thereon the carcass band, and at this time, a toroidal core body is radially expanded to a maximum diameter while locking bead cores acting to latch opposite ends of the carcass band center portion and the tire component members are assembled based on the toroidal core body, thereby enabling precise assembling of the tire component members, with high precision in positions of the tire component members relative to both bead cores.

The invention claimed is:
1. A tire building drum comprising:
 a pair of bead lock means adapted to be displaced toward and away from each other and expanded or contracted radially;
 carcass band folding-back means positioned adjacent to the bead lock means, respectively;
 a center shaft for supporting these means;
 a core body at an axial inside of said bead lock means, said core body comprising a plurality of rigid support members toroidally disposed and adapted to be radially displaced to thereby expand or contract the core body; and a center bladder, deformable for expansion or contraction, which extends at a radial outside of said core body, and which has both axial side portions adapted to be displaced toward and away from each other integrally with said bead lock means, respectively;

wherein the center bladder is expandable or contractible independently of the movement of the rigid support members, both in axial and radial directions, and thereby fully expands a carcass band to a toroidal shape independent of the core body, and wherein the core body is constructed such that, in a partially radially expanded state to a height where axially opposite side surfaces of each of the rigid support members correspond to radial positions of bead cores, the axially opposite side surfaces of each of the rigid support members provide support from an axial inside for axially opposite side surfaces of the carcass band expanded to toroidal shape by the center bladder at a position corresponding to a radial position of bead cores when the carcass band folding-back means is actuated, and the core body being radially expandable to a maximum diameter to provide support for the toroidal carcass band over a full width to provide a solid bonding surface for assembling additional tire component members including belt members and a tread rubber.

2. The tire building drum of claim 1, wherein said rigid support members are provided with comb tooth portions, respectively, for engagement of said rigid support members with each other.

3. The tire building drum according to claim 1, wherein said bead lock means each comprise: bead lock segments circumferentially arranged adjacent to each other so as to be expanded or contracted in an annular shape; associated links having one end hinged to said bead lock segments, respectively; bead lock pistons coupled to a second end of said links, respectively, and provided in an axially displaceable manner; and bead lock cylinders adapted to displace the associated bead lock pistons, respectively.

4. The tire building drum according to claim 1, wherein said carcass band folding-back means are adapted to be displaced toward and away from each other, integrally with said bead lock means at the axially same sides as said carcass band folding-back means, respectively; and wherein each of said carcass band folding-back means includes: a plurality of folding-back arms arranged in a circumferential direction and having tip end portions at axial insides, respectively; neck-turning members hinged to the tip end portions of said folding-back arms, respectively, so as to be swung to radial inside and outside; folding-back rollers circumferentially extending and born by longitudinal opposite end portions of the associated neck-turning members, respectively; a slide ring hinged to proximal ends of said plurality of folding-back arms and adapted to be displaceable to axial inside and outside relative to the associated bead lock means; and urging means for exerting a swinging force directed toward a radial inside, onto said folding-back arms.

5. The tire building drum according to claim 4, wherein each of a pair of said folding-back rollers born by the associated neck-turning member is divided into two portions at both sides of an associated portion of said neck-turning member for supporting the folding-back roller, and is circumferentially protruded from the associated neck-turning member, so that protruded directions of said pair of folding-back rollers are opposite to each other, and so that a roller rotational shaft supporting portion corresponding to one of said pair of folding-back rollers has a circumferentially extended area positioned within a circumferentially extended area of the other folding-back roller.

6. The tire building drum according to claim 4, wherein each of said folding-back rollers is provided with roller rotational speed restricting means for restricting a roller rotational speed correspondingly to this speed.

7. The tire building drum according to claim 1, wherein said core body is provided by one in number and arranged in-between said pair of bead lock means; and wherein said tire building drum further comprises: a pair of sleeves adapted to be displaced toward and away from each other on said center shaft; sleeve reciprocative driving means for displacing said sleeves; and link mechanisms having one ends coupled to said rigid support members, respectively, and the other ends coupled to said pair of sleeves, respectively, said link mechanisms being each adapted with a pair of links having intermediate portions hinged to each other, respectively.

8. The tire building drum according to claim 7, wherein said sleeve reciprocative driving means is adapted with: screw portions formed at end portions of said sleeves, respectively, and having mutually opposite lead orientations for the right and left sleeves, respectively; screw blocks threadedly engaged with said screw portions, respectively; and rotating means for relatively rotating said sleeves and the associated screw blocks, respectively;

wherein said tire building drum further comprises: sliders having mounted thereon said bead lock means, respectively, and adapted to displace said bead lock means toward and away from each other; and bead lock reciprocative driving means for displacing said pair of bead lock means; and wherein said bead lock reciprocative driving means is adapted with: female screw members coupled to radial insides of said sliders, respectively; a screw shaft disposed in a hollow of said center shaft and having right and left male screw portions threadedly engaged with the associated female screw members, respectively; and screw shaft rotating means for rotating the screw shaft; in which said right and left male screw portions of said screw shaft have mutually opposite lead orientations, respectively.

9. The tire building drum according to claim 8, further comprising: means for restraining rotation of said screw blocks; and means for rotating, together with said sleeves, said center shaft fitted through said sleeves by circumferential convex and concave portions.

10. The tire building drum according to claim 8, further comprising: means for rotating both said screw blocks synchronizedly with each other; and means for fitting said sleeves onto said center shaft by circumferential convex and concave portions.

11. The tire building drum according to claim 9, further comprising: means for restricting rotation of said screw blocks relative to said center shaft.

12. The tire building drum according to claim 7, wherein said sleeve reciprocative driving means is adapted with: female screw members coupled to said sleeves at radial insides thereof, respectively; a screw shaft disposed in a hollow of said center shaft and having right and left male screw portions threadedly engaged with the associated female screw members, respectively; and screw shaft rotating means for rotating the screw shaft; in which the right and left male screw portions of said screw shaft have mutually opposite lead orientations, respectively;

wherein said tire building drum further comprises: sliders having mounted thereon said bead lock means, respectively, and adapted to displace said bead lock means toward and away from each other; and bead lock reciprocative driving means for displacing said pair of bead lock means; and wherein said bead lock reciprocative driving means is adapted with: screw portions formed at end portions of said sliders, respectively, so as to have mutually opposite screw thread extending directions for the right and left sliders, respectively; screw blocks threadedly engaged with said screw portions, respectively; and rotating means for rotating said sliders and said screw blocks relative to each other.

13. The tire building drum according to claim 12, further comprising: means for restraining rotation of said screw blocks; and means for rotating, together with said sliders, said center shaft fitted through said sliders by circumferential convex and concave portions.

14. The tire building drum according to claim 12, further comprising: means for rotating both said screw blocks synchronizedly with each other; and means for fitting said sliders onto said center shaft by circumferential convex and concave portions.

15. The tire building drum according to claim 13, further comprising: means for restricting rotation of said screw blocks relative to said center shaft.

16. A tire building method using the tire building drum according to claim 1, comprising steps of:
locking the bead cores by said bead lock means, respectively;
then bulging a center portion of the carcass band while displacing said bead lock means close to each other;
folding back side portions of the carcass band to radial outsides around the bead cores, respectively;
thereafter radially expanding said core body to a maximum diameter, while locking the bead cores; and
assembling tire component members onto the radially expanded core body.

17. A tire building method using the tire building drum according to claim 4, comprising a step of:
moving said folding-back arms of said folding-back means to axial insides synchronizedly with each other, respectively, to synchronizingly swing to radial outsides said folding-back arms around proximal ends thereof against swinging forces by said urging means while causing said folding-back rollers to be rolledly contacted with carcass band side portions, respectively, to thereby fold back the carcass band around the bead cores.

18. The tire building method according to claim 17, wherein said folding-backarms are synchronizedly swung to radial outsides, respectively, such that side portions of the carcass band to be folded back by said folding-back means are rolledly pressure-jointed to a carcass band center portion by any one of said folding-back rollers at any point of the side portions of the carcass band.

19. A tire building method using the tire building drum according to claim 7, comprising a step of: radially expanding said core body to a position where at least side surfaces of said core body are opposed to the bead cores, respectively, and then folding back carcass band side portions around the bead cores, respectively.

20. The tire building method according to claim 19, further comprising a step of: radially expanding said core body to a position where side surfaces of said core body are opposed to the bead cores, respectively, and thereafter displacing said bead lock means towards an axial center to bring said bead lock means close to core body side surfaces, and starting folding back of the carcass band side portions.

21. The tire building method according to claim 20, further comprising a step of: folding back the carcass band side portions by using folding-back rollers while urging the carcass band side portions toward the carcass band center portion supported by core body side portions.

22. The tire building method according to claim 19, further comprising a step, after folding back the carcass band side portions around the bead cores, respectively, of: pressure-jointing folded back end portions by stitching rollers each subjected to a knurling treatment.

23. The tire building method according to claim 19, further comprising a step of: gradually reducing a pressure within said center bladder, as the core body is radially expanded to a maximum diameter to bulge a center portion of the carcass band.

24. The tire building method according to claim 19, further comprising steps of:
detecting a load of a motor for driving said sleeve reciprocative driving means upon radially expanding said core body; and
controlling at least one of an internal pressure of the center bladder, and a spacing between said pair of bead lock means, based on a value of the load.

* * * * *